United States Patent
Hayashi et al.

(10) Patent No.: US 7,885,489 B2
(45) Date of Patent: Feb. 8, 2011

(54) IMAGE PICKUP APPARATUS AND METHOD AND APPARATUS FOR MANUFACTURING THE SAME

(75) Inventors: Yusuke Hayashi, Tokyo (JP); Naoto Ohara, Tokyo (JP)

(73) Assignee: Kyocera Corporation, Kyoto (JP)

( * ) Notice: Subject to any disclaimer, the term of this patent is extended or adjusted under 35 U.S.C. 154(b) by 802 days.

(21) Appl. No.: 11/864,157

(22) Filed: Sep. 28, 2007

(65) Prior Publication Data

US 2008/0080019 A1  Apr. 3, 2008

(51) Int. Cl.
G06K 9/40 (2006.01)
H04N 1/40 (2006.01)
G06K 9/20 (2006.01)

(52) U.S. Cl. ............... 382/312; 382/254; 382/260; 382/274; 358/312

(58) Field of Classification Search .......... 358/3.23, 358/474, 475, 444, 443, 448; 382/254, 260, 382/274, 312
See application file for complete search history.

(56) References Cited

U.S. PATENT DOCUMENTS

| | | | |
|---|---|---|---|
| 6,021,005 A | 2/2000 | Cathey, Jr. et al. | |
| 6,069,738 A | 5/2000 | Cathey, Jr. | |
| 6,525,302 B2 | 2/2003 | Dowski, Jr. et al. | |
| 6,642,504 B2 | 11/2003 | Cathey, Jr. et al. | |
| 7,400,393 B2* | 7/2008 | Shibata et al. | 356/237.5 |
| 2003/0076514 A1* | 4/2003 | Gallagher et al. | 358/1.9 |
| 2004/0136605 A1* | 7/2004 | Seger et al. | 382/274 |
| 2006/0012385 A1* | 1/2006 | Tsao et al. | 324/750 |
| 2007/0086674 A1* | 4/2007 | Guan | 382/275 |
| 2007/0291152 A1* | 12/2007 | Suekane et al. | 348/333.02 |
| 2008/0081996 A1* | 4/2008 | Grenon et al. | 600/443 |

FOREIGN PATENT DOCUMENTS

| | | |
|---|---|---|
| JP | 2003-235794 | 8/2003 |
| JP | 2004-37733 | 2/2004 |
| JP | 2004-153497 | 5/2004 |

OTHER PUBLICATIONS

Edward R. Dowski, Jr., Robert H. Cormack, Scott D. Sarama, "Wavefront Coding; jointly optimized optical and digital imaging systems", Sep. 2007.
Edward R. Dowski, Jr., Gregory E. Johnson, "Wavefront Coding; A modern method of achieving high performance and/or low cost imaging systems", Sep. 2007.

* cited by examiner

Primary Examiner—Jerome Grant, II
(74) Attorney, Agent, or Firm—Pattric J. Rawlins; Procopio, Cory, Hargreaves & Savitch LLP

(57) ABSTRACT

An image pickup apparatus includes an element-including optical system, a detector, and a converter. The element-including optical system has an optical system and an optical wavefront modulation element which modulates an optical transfer function. The detector picks up an object image that passes through the optical system and the optical wavefront modulation element. The converter generates an image signal with a smaller blur than that of a signal of a blurred object image output from the detector by performing a filtering process of the optical transfer function to improve a contrast. A focal position of the element-including optical system is set by moving the element-including optical system to the focal position which is corresponding to a predetermined object distance using a contrast of the object based on the image signal.

16 Claims, 33 Drawing Sheets

FIG. 31

EXAMPLE OF KERNEL DATA STORAGE ROM

| OPTICAL MAGNIFICATION | ×1.5 | ×5 | ×10 |
|---|---|---|---|
| KERNEL DATA | A | B | C |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

$$C = \begin{pmatrix} a' & b' & c' & d' \\ e' & f' & g' & h' \\ i' & j' & k' & l' \\ m' & n' & o' & p' \end{pmatrix}$$

FIG. 32

EXAMPLE OF KERNEL TABLE

| APERTURE STOP | F2.8 | F4 |
|---|---|---|
| KERNEL DATA | A | B |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

EXAMPLE OF KERNEL TABLE

| OBJECT DISTANCE INFORMATION | 100 mm | 500 mm | 4 m |
|---|---|---|---|
| KERNEL DATA | A | B | C |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

$$C = \begin{pmatrix} a' & b' & c' & d' \\ e' & f' & g' & h' \\ i' & j' & k' & l' \\ m' & n' & o' & p' \end{pmatrix}$$

FIELD (0.000, 0.000)

DEFOCUS = 0.2 mm 0.4000 (mm)
CANTER OF GRAVITY (0.0000, 0.0000)

FIELD (0.000, 0.000)

BEST FOCUS 0.4000 (mm)
CANTER OF GRAVITY (0.0000, 0.0000)

FIELD (0.000, 0.000)

DEFOCUS = −0.2 mm 0.4000 (mm)
CANTER OF GRAVITY (0.0000, 0.0000)

IMAGE PICKUP APPARATUS AND METHOD AND APPARATUS FOR MANUFACTURING THE SAME

CROSS-REFERENCE TO RELATED APPLICATIONS

The present application claims priority under 35 U.S.C. §119 to Japanese Patent Application No. 2006-263799, filed Sep. 28, 2006. The contents of the application are incorporated herein by reference in its entirety.

BACKGROUND OF THE INVENTION

1. Field of the Invention

The present invention relates to an image pickup apparatus for use in a digital still camera, a mobile phone camera, a Personal Digital Assistant (PDA) camera, an image inspection apparatus, an industrial camera used for automatic control, etc., which includes a detector (what is called image pickup device, such as CCD and CMOS) and an optical system. The present invention also relates to a method and an apparatus for manufacturing the image pickup apparatus.

2. Description of the Related Art

Recently, as in digital cameras, solid-state detectors, such as Charge Coupled Devices (CCD) and Complementary Metal Oxide Semiconductor (CMOS) sensors, have been provided on imaging planes instead of films.

In image pickup apparatuses including CCDs or CMOS sensors, an image of an object is optically taken by an optical system and is extracted by a detector in the form of an electric signal. Such an apparatus is used in, for example, a digital still camera, a video camera, a digital video unit, a personal computer, a mobile phone, a PDA, an image inspection apparatus, an industrial camera used for automatic control, etc.

FIG. 42 is a schematic diagram illustrating the structure of a known image pickup apparatus and the state of ray bundles. Referring to FIG. 42, an image pickup apparatus 1 includes an optical system 2 and a detector 3, such as a CCD and a CMOS sensor. The optical system 2 includes object-side lenses 21 and 22, an aperture stop 23, and an imaging lens 24 arranged in that order from an object side (OBJS) toward the detector 3. In the image pickup apparatus 1, the best-focus plane coincides with the plane on which the detector 3 is disposed. FIGS. 43A to 43C show spot images formed on a light-receiving surface of the detector 3 included in the image pickup apparatus 1.

In such an image pickup apparatus, in order to achieve a large depth of field, a method has been suggested in which light is regularly blurred by a phase plate and is reconstructed by digital processing. On the other hand, an automatic exposure control system for a digital camera in which filtering process using a transfer function is performed has also been suggested.

As a focusing method, a so-called hill-climbing autofocus (AF) method is known in which a focal position is determined by acquiring a peak value of contrast.

In known image pickup apparatuses, it is premised that a Point Spread Function (PSF) obtained when the above-described phase plate is placed in an optical system is constant. If the PSF varies, it becomes difficult to obtain an image with a large depth of field by convolution using a kernel.

In particular, in lens systems like zoom systems and autofocus (AF) systems, there is a large problem in adopting the above-mentioned structure because high precision is required in the optical design and costs are increased accordingly. More specifically, in known image pickup apparatuses, a suitable convolution operation cannot be performed and the optical system must be designed so as to eliminate aberrations, such as astigmatism, coma aberration, and zoom chromatic aberration that cause a displacement of a spot image at wide angle and telephoto positions. However, to eliminate the aberrations, the complexity of the optical design is increased and the number of design steps, costs, and the lens size are increased.

For example, when an image obtained by shooting an object in a dark place is reconstructed by signal processing, noise is amplified at the same time. Therefore, in the optical system which uses both an optical unit and signal processing, that is, in which an optical wavefront modulation element, such as the above-described phase plate, is used and signal processing is performed, there is a problem that noise is amplified and the reconstructed image is influenced when an object is shot in a dark place.

In addition, when the aperture is stopped down to shoot a bright object, the phase modulation element is covered by the aperture stop and the phase variation is reduced. This affects the reconstructed image when the image reconstruction process is performed.

To enable inexpensive mass production, it is important to make variation in lenses and sensors as small as possible. However, the size of digital still cameras and small cameras for use in Personal Digital Assistants (PDA) has recently been reduced, and the size of lenses and sensors included therein has been reduced. On the other hand, there is a limit to reducing variation in the lenses. In addition, reduction in pixel pitch of the sensors leads to requirements for lenses with higher resolution and small variation. The above-described optical systems including phase modulation elements are also demanded to reduce the variation in lenses since filter processing is performed using an optical transfer function (OTF).

According to a further aspect of the present invention, the image pickup apparatus includes an element-including optical system, a detector, and a converter. The element-including optical system has an optical system and an optical wavefront modulation element which modulates an optical transfer function. The detector picks up an object image that passes through the optical system and the optical wavefront modulation element. The converter generates an image signal with a smaller blur than that of a signal of a blurred object image output from the detector by performing a filtering process of the optical transfer function to improve a contrast. A focal position of the element-including optical system is set by moving the element-including optical system to the focal position which is corresponding to a predetermined object distance using a contrast of the object based on the image signal.

According to another aspect of the present invention, a manufacturing apparatus for manufacturing an image pickup apparatus includes an adjusting device. The adjusting device adjusts a focal position by moving the element-including optical system and/or the image pickup device to a focal position. The focal position corresponds to a predetermined object distance using a contrast of the object based on an image signal obtained through the element-including optical system.

According to further aspect of the present invention, a method of manufacturing an image pickup apparatus includes two steps. In the first step, an element-including optical system was formed by placing an optical wavefront modulation element that modulates an optical transfer function in an optical system. In the second step, a focal position is adjusted by moving the element-including optical system and/or a detector to the focal position corresponding to a predetermined object distance using a contrast of an object based on an image signal detected by the detector.

SUMMARY OF THE INVENTION

According to one aspect of the present invention, an image pickup apparatus includes an optical system, a detector, a memory and an image processing unit. The detector picks up an object image that passes through the optical system. The memory stores reconstruction filter information that is selected from one or a plurality of pieces of reconstruction filter information using which an image that satisfies a predetermined evaluation criterion can be obtained. The image processing unit performs a reconstruction filtering process for an object image signal from the detector using the reconstruction filter information stored in the memory and for an optical transfer function.

According to another aspect of the present invention, a manufacturing apparatus for manufacturing an image pickup apparatus includes an optical system unit and a filtering process selector. The optical system unit includes an optical system, a detector picking up an object image that passes through the optical system and a memory storing reconstruction filter information. The filtering process selector includes a reconstruction filter storage unit, an operation unit, an image evaluation unit and a memory update unit. The reconstruction filter storage unit stores a plurality of pieces of reconstruction filter information. The operation unit reconstructs an image from the optical system unit using the reconstruction filter information stored in the reconstruction filter storage unit. The image evaluation unit determines whether or not the image reconstructed by the operation unit satisfies a predetermined evaluation criterion. The memory update unit updates the memory in the optical system unit with reconstruction filter information using which a reconstructed image that satisfies the evaluation criterion according to the image evaluation unit is obtained.

According to further aspect of the present invention, a method for manufacturing an image pickup apparatus includes a storing step, an image pickup step, a reconstruction step, an evaluation step and a storing step. In the storing step, a plurality of pieces of reconstruction filter information is stored in a memory. In the image pickup step, an image that passes through an optical system is picked up. In the reconstruction step, an image obtained in the image pickup step using the reconstruction filter information obtained in the storing step is reconstructed. In the evaluation step, whether or not the image reconstructed in the reconstruction step satisfies a predetermined evaluation criterion is evaluated. In the storing step, reconstruction filter information using which a reconstructed image that satisfies the evaluation criterion in the image evaluation step is obtained is stored.

BRIEF DESCRIPTION OF THE DRAWINGS

FIG. 31 is a diagram illustrating an example of data stored in a kernel data ROM (optical magnification).

FIG. 32 is a diagram illustrating another example of data stored in a kernel data ROM (F number).

DETAILED DESCRIPTION OF THE PREFERRED EMBODIMENT

An embodiment of the present invention will be described below with reference to the accompanying drawings.

Figure 1:
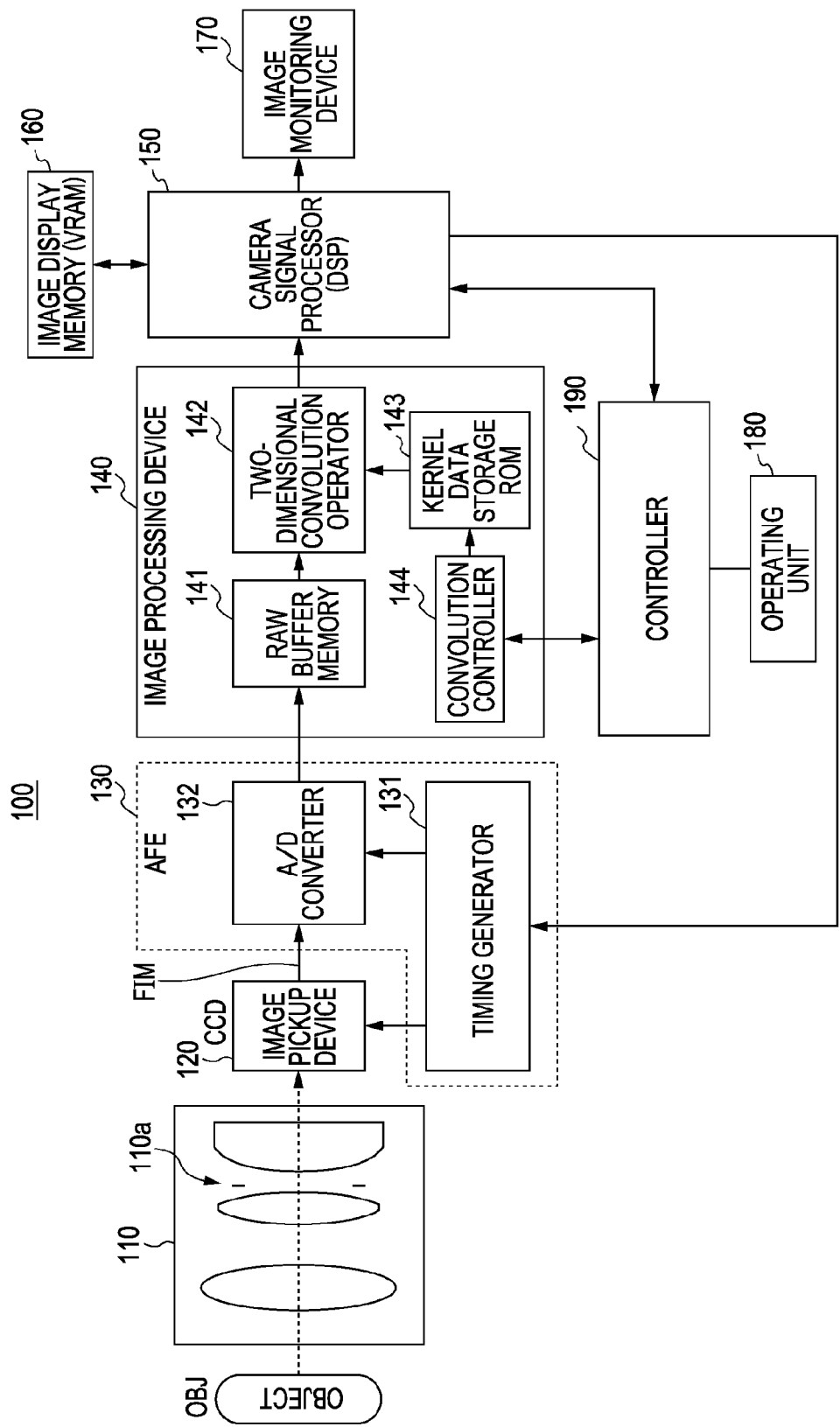
FIG. 1 is a block diagram illustrating the structure of an image pickup apparatus according to an embodiment of the present invention.

As shown in FIG. 1, an image pickup apparatus 100 according to the present embodiment includes an optical system 110, a detector 120, an analog front end (AFE) unit 130, an image processing device 140, a signal processor (DSP) 150, an image display memory 160, an image monitoring device 170, an operating unit 180, and a controller 190.

The optical system 110 supplies an image obtained by shooting an object OBJ to the detector 120. The optical system 110 includes a variable aperture 110a.

The detector 120 includes a CCD or a CMOS sensor. The detector 120 receives an image from the optical system 110 is formed and outputs first image information representing the image formed thereon. The output is sent to the image processing device 140 via the AFE unit 130 as a first image (FIM) electric signal.

In FIG. 1, a CCD is shown as an example of the detector 120.

The focal position is adjusted by moving the element-including optical system and/or the image pickup device to a focal position corresponding to a predetermined object distance using a contrast of the object based on the image signal. The image signal is repeatedly detected through the optical system 110 which includes an optical wavefront modulation element for modulating the optical transfer function (OTF). Hereinafter an optical system having an optical wavefront modulation element is sometimes called an element-including optical system.

The AFE unit 130 includes a timing generator 131 and an analog/digital (A/D) converter 132.

The timing generator 131 generates timing for driving the CCD in the detector 120. The A/D converter 132 converts an analog signal input from the CCD into a digital signal, and outputs the thus-obtained digital signal to the image processing device 140.

The image processing device (two-dimensional convolution means) 140 receives the digital signal representing the picked-up image from the AFE unit 130, subjects the signal to a two-dimensional convolution process, and outputs the result to the signal processor 150. The signal processor 150 performs a filtering process of the optical transfer function (OTF) on the basis of the information obtained from the image processing device 140 and exposure information obtained from the controller 190. The exposure information includes aperture information. The image processing device 140 has a function of generating an image signal with a smaller blur than that of a blurred object-image signal that is obtained from the detector 120. In addition, the signal processor 150 has a function of performing noise-reduction filtering in the first step.

The image processing device 140 has a function of improving the contrast by performing a filtering process of the optical transfer function (OTF).

The image processing device 140 includes a ROM 143 that functions as a memory for storing reconstruction filter information, such as kernel data, that is selected in advance. The blurred object-image signal is subjected to a reconstruction filtering process using the reconstruction filter information stored in the ROM 143. As described in detail below, the reconstruction filter information stored in the ROM 143 is selected from one or a plurality of pieces of reconstruction filter information using which, of images reconstructed using reconstruction filters, an image that satisfy a predetermined evaluation criterion can be obtained.

In the present embodiment, the reconstruction filters are changed in accordance with the manufacturing and/or assembling variations in the optical system 110 and/or the detector 120. Accordingly, variations in the optical systems (lenses) and/or the detectors (sensors) can be compensated for.

Processes performed by the image processing device 140 will be described in detail below.

The signal processor (DSP) 150 performs processes including color interpolation, white balancing, YCbCr conversion, compression, filing, etc., stores data in the memory 160, and displays images on the image monitoring device 170.

The controller 190 performs exposure control, receives operation inputs from the operating unit 180 and the like, and determines the overall operation of the system on the basis of the received operation inputs. Thus, the controller 190 controls the AFE unit 130, the image processing device 140, the signal processor 150, the variable aperture 110a, etc., so as to perform arbitration control of the overall system.

The structures and functions of the element-including optical system 110 and the image processing device 140 according to the present embodiment will be described below.

Figure 2:
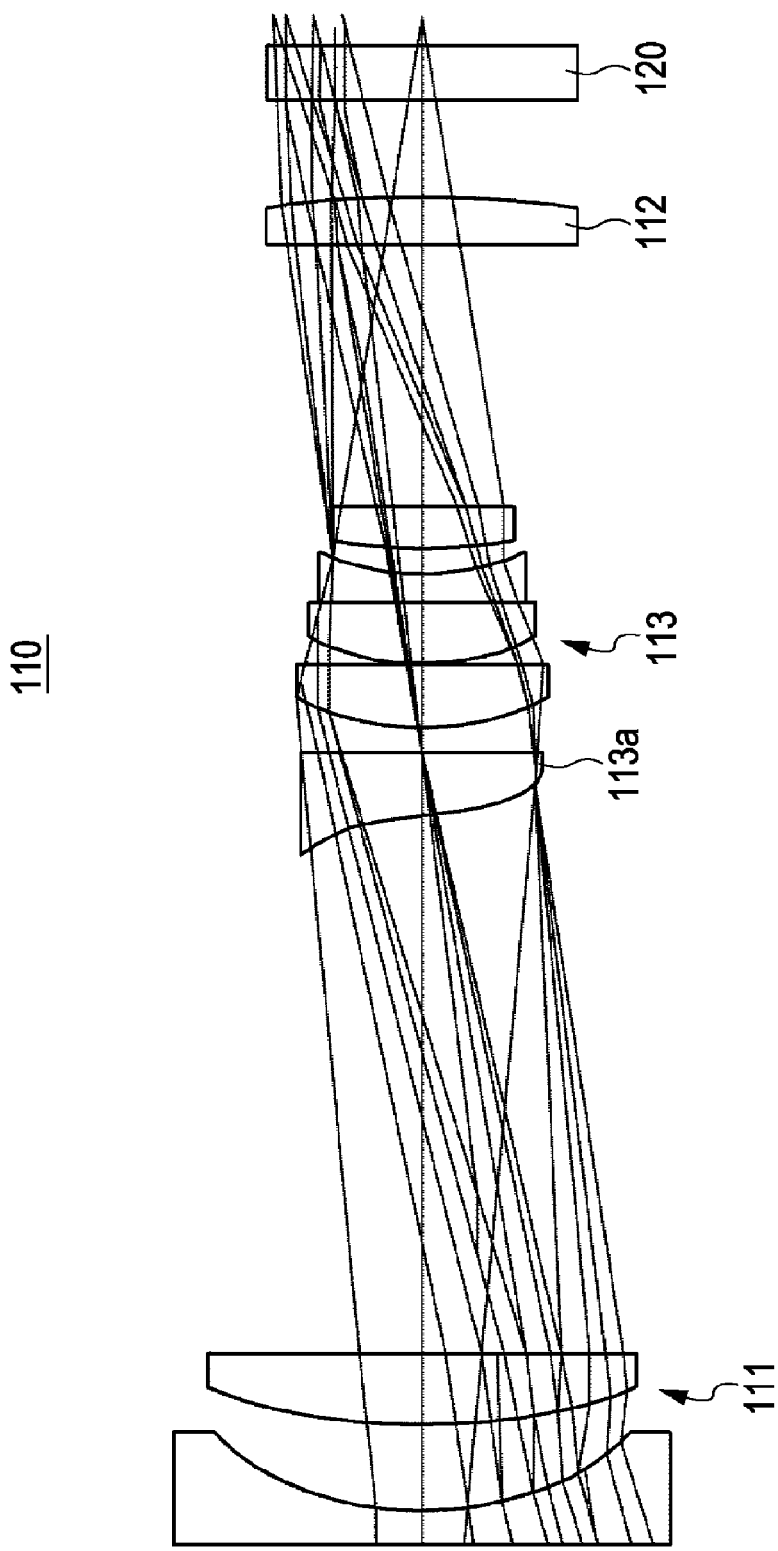
FIG. 2 is a schematic diagram illustrating the structure of an optical system at a wide-angle position in an image pickup apparatus having a zoom function according to the embodiment.
Figure 3:
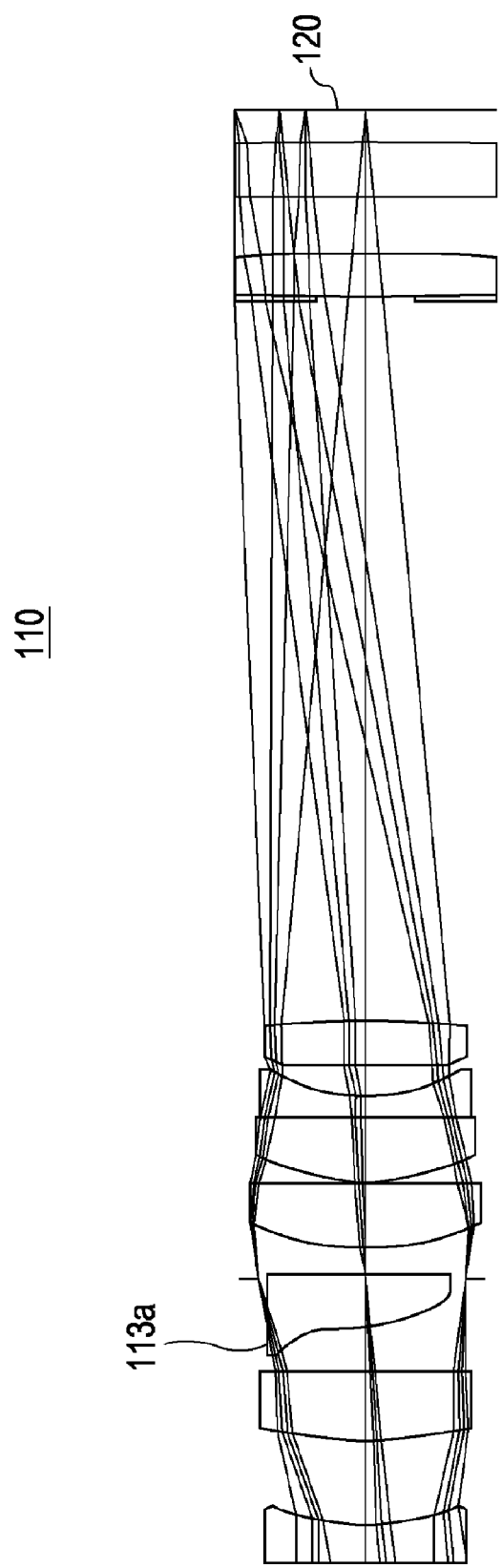
FIG. 3 is a schematic diagram illustrating the structure of the optical system at a telephoto position in the image pickup apparatus having the zoom function according to the embodiment.

FIGS. 2 and 3 are schematic diagrams illustrating the element-including optical system 110 having a zoom function (hereinafter sometimes called a zoom optical system) in the image pickup apparatus. FIG. 2 shows a wide-angle position and FIG. 3 shows a telephoto position.

The element-including zoom optical system 110 shown in FIGS. 2 and 3 includes an object-side lens 111, an imaging lens 112, and a movable lens group 113. The object-side lens 111 is disposed at the object side (OBJS). The imaging lens 112 is provided for forming an image on the detector 120. The movable lens group 113 is placed between the object-side lens 111 and the imaging lens 112. The movable lens group 113 includes an optical wavefront modulation element 113a for changing the wavefront shape of light that passes through the imaging lens 112 to form an image on a light-receiving surface of the detector 120. The optical wavefront modulation element 113a is, for example, a phase plate having a three-dimensional curved surface. An aperture stop (not shown) is also placed between the object-side lens 111 and the imaging lens 112.

In present embodiment, for example, the variable aperture 110a is provided and the aperture size (opening) thereof is controlled by the exposure control (device).

Although a phase plate is used as the optical wavefront modulation element in the present embodiment, any type of optical wavefront modulation element may be used as long as the wavefront shape can be changed. For example, an optical element having a varying thickness (e.g., a phase plate having a three-dimensional curved surface), an optical element having a varying refractive index (e.g., a gradient index wavefront modulation lens), an optical element having a coated lens surface or the like so as to have varying thickness and refractive index (e.g., a wavefront modulation hybrid lens or a structure in which a lens surface functions as a phase plane), a liquid crystal device capable of modulating the phase distribution of light (e.g., a liquid-crystal spatial phase modulation device), etc., may be used as the optical wavefront modulation element.

According to the present embodiment, a regularly blurred image is obtained using a phase plate as the optical wavefront modulation element. However, lenses included in normal optical systems that can form a regularly blurred image similar to that obtained by the optical wavefront modulation element may also be used. In such a case, the optical wavefront modulation element can be omitted from the optical system. In this case, instead of dealing with blur caused by the phase plate as described below, blur caused by the optical system will be dealt with.

The element-including zoom optical system 110 shown in FIGS. 2 and 3 is obtained by placing the optical phase plate 113a in a 3× zoom system of a digital camera.

The phase plate 113a shown in FIGS. 2 and 3 is an optical lens by which light converged by an optical system is regularly blurred. Due to the phase plate, an image that is not in focus at any point thereof can be formed on the detector 120.

In other words, the phase plate 113a forms light with a large depth (which plays a major role in image formation) and flares (blurred portions).

A system for performing digital processing of the regularly blurred image so as to reconstruct a focused image is called a wavefront-aberration-control optical system or a Depth Expansion Optical System (DEOS). In the present embodiment, the function of this system is provided by the image processing device 140.

Figure 6:
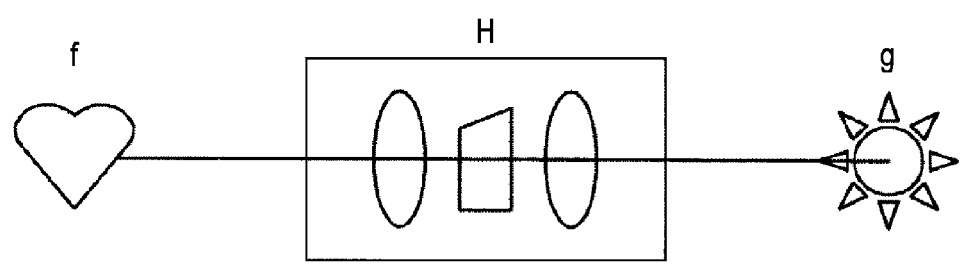
FIG. 6 is a diagram illustrating the principle of a DEOS.

The basic principle of the DEOS will be described below. As shown in FIG. 6, when an object image f is supplied to the DEOS H, an image g is generated.

This process can be expressed by the following equation:

$$g = H * f$$

where '*' indicates convolution.

In order to obtain the object from the generated image g, the following process is necessary:

$$f = H^{-1} * g$$

A kernel size and a coefficient of the H function will be described below.

ZPn, ZPn−1 ... indicate zoom positions and Hn, Hn−1, ... indicate the respective H functions.

Since the corresponding spot images differ from each other, the H functions can be expressed as follows:

$$Hn = \begin{pmatrix} a & b & c \\ d & e & f \end{pmatrix} \quad Hn-1 = \begin{pmatrix} a' & b' & c' \\ d' & e' & f' \\ g' & h' & i' \end{pmatrix}$$

The difference in the number of rows and/or columns in the above matrices is called the kernel size, and each of the numbers in the matrices is called the coefficient.

Each of the H functions may be stored in a memory. Alternatively, the PSF may be set as a function of object distance and be calculated on the basis of the object distance, so that the H function can be obtained by calculation. In such a case, a filter optimum for an arbitrary object distance can be obtained. Alternatively, the H function itself may be set as a function of object distance, and be directly determined from the object distance.

In the present embodiment, as shown in FIG. 1, the image taken by the element-including optical system 110 is picked up by the detector 120, and is input to the image processing device 140 when the aperture is open. The image processing device 140 acquires a coefficient that corresponds to the element-including optical system 110 and generates an image signal with a smaller blur than that of the blurred-image signal from the detector 120 using the acquired coefficient.

In the present embodiment, as described above, the term "blur" refers to the phenomenon in which an image that is not in focus at any point thereof is formed on the detector 120 due to the phase plate 113a placed in the optical system, and in which light with a large depth (which plays a major role in image formation) and flares (blurred portions) are formed by the phase plate 113a. Since the image is blurred and blurred portions are formed, the term "blur" has a meaning similar to that of "aberration". Therefore, in the present embodiment, blur is sometimes explained as aberration.

In the present embodiment, the DEOS is used so that a high-definition image can be obtained, the structure of the optical system can be simplified, and the costs can be reduced.

Features of the DEOS will be described in more detail below.

Figure 7A:
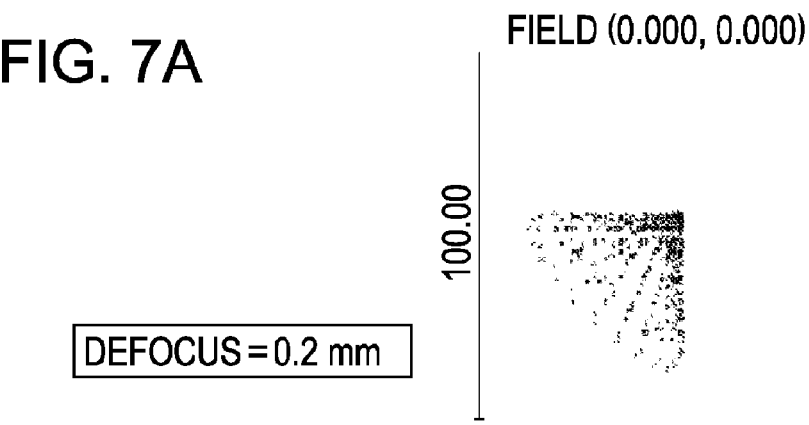
FIG. 7A illustrates a spot image formed on a light-receiving surface of a detector according to the embodiment when a focal point is displaced by 0.2 mm (Defocus=0.2 mm).
Figure 7B:
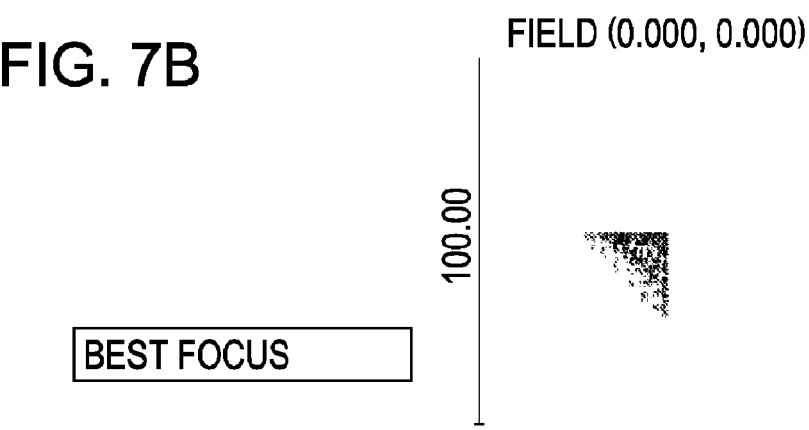
FIG. 7B illustrates a spot image formed on the light-receiving surface of the detector when the focal point is not displaced (Best focus).
Figure 7C:
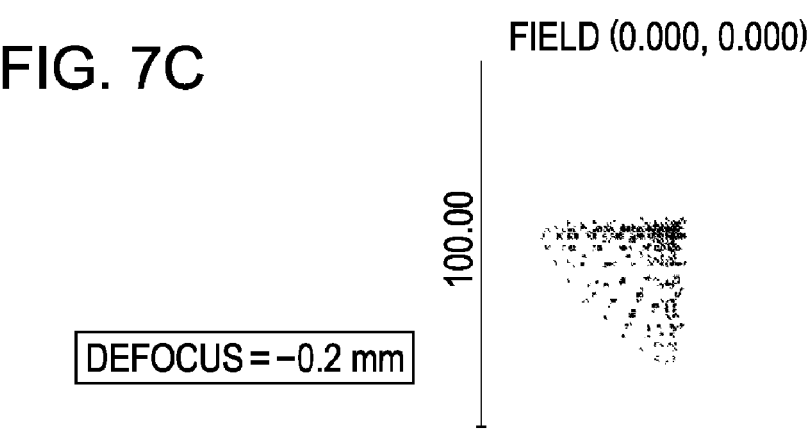
FIG. 7C illustrates a spot image formed on the light-receiving surface of the detector when the focal point is displaced by −0.2 mm (Defocus=−0.2 mm).

FIGS. 7A to 7C show spot images formed on the light-receiving surface of the detector 120.

FIG. 7A shows the spot image obtained when the focal point is displaced by 0.2 mm (Defocus=0.2 mm), FIG. 7B shows the spot image obtained when the focal point is not displaced (Best focus), and FIG. 7C shows the spot image obtained when the focal point is displaced by −0.2 mm (Defocus=−0.2 mm).

As is clear from FIGS. 7A to 7C, in the image pickup apparatus 100 according to the present embodiment, light with a large depth (which plays a major role in image formation) and flares (blurred portions) are formed by the phase plate 113a.

Thus, the first image FIM formed by the image pickup apparatus 100 according to the present embodiment is in light conditions with an extremely large depth.

Figure 8A:
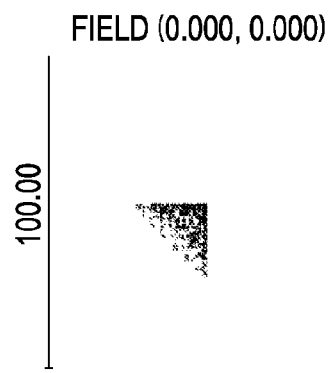
FIG. 8A is a diagram for explaining an MTF of a first image formed by the detector and illustrates a spot image formed on the light-receiving surface of the detector included in the image pickup apparatus.
Figure 8B:
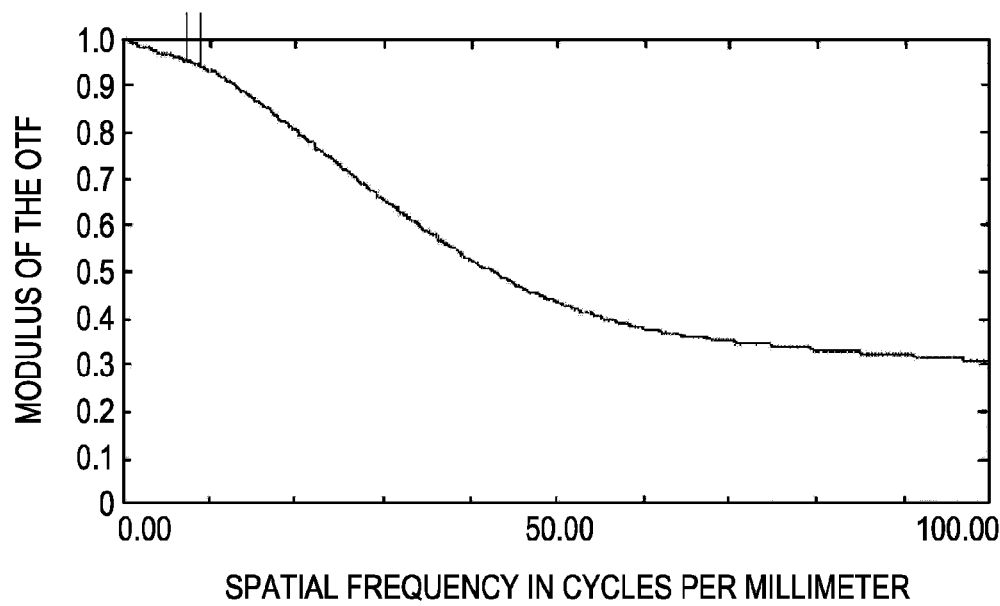
FIG. 8B is a graph for explaining the MTF of the first image formed by the detector and illustrates the MTF characteristic with respect to spatial frequency.

FIGS. 8A and 8B are diagrams for explaining a Modulation Transfer Function (MTF) of the first image formed by the image pickup apparatus according to the present embodiment. FIG. 8A shows a spot image formed on the light-receiving surface of the detector included in the image pickup apparatus. FIG. 8B shows the MTF characteristic with respect to spatial frequency.

In the present embodiment, a final, high-definition image is obtained by a correction process performed by the image processing device 140 including, for example, a Digital Signal Processor (DSP). Therefore, as shown in FIGS. 8A and 8B, the MTF of the first image is basically low.

Figure 9:
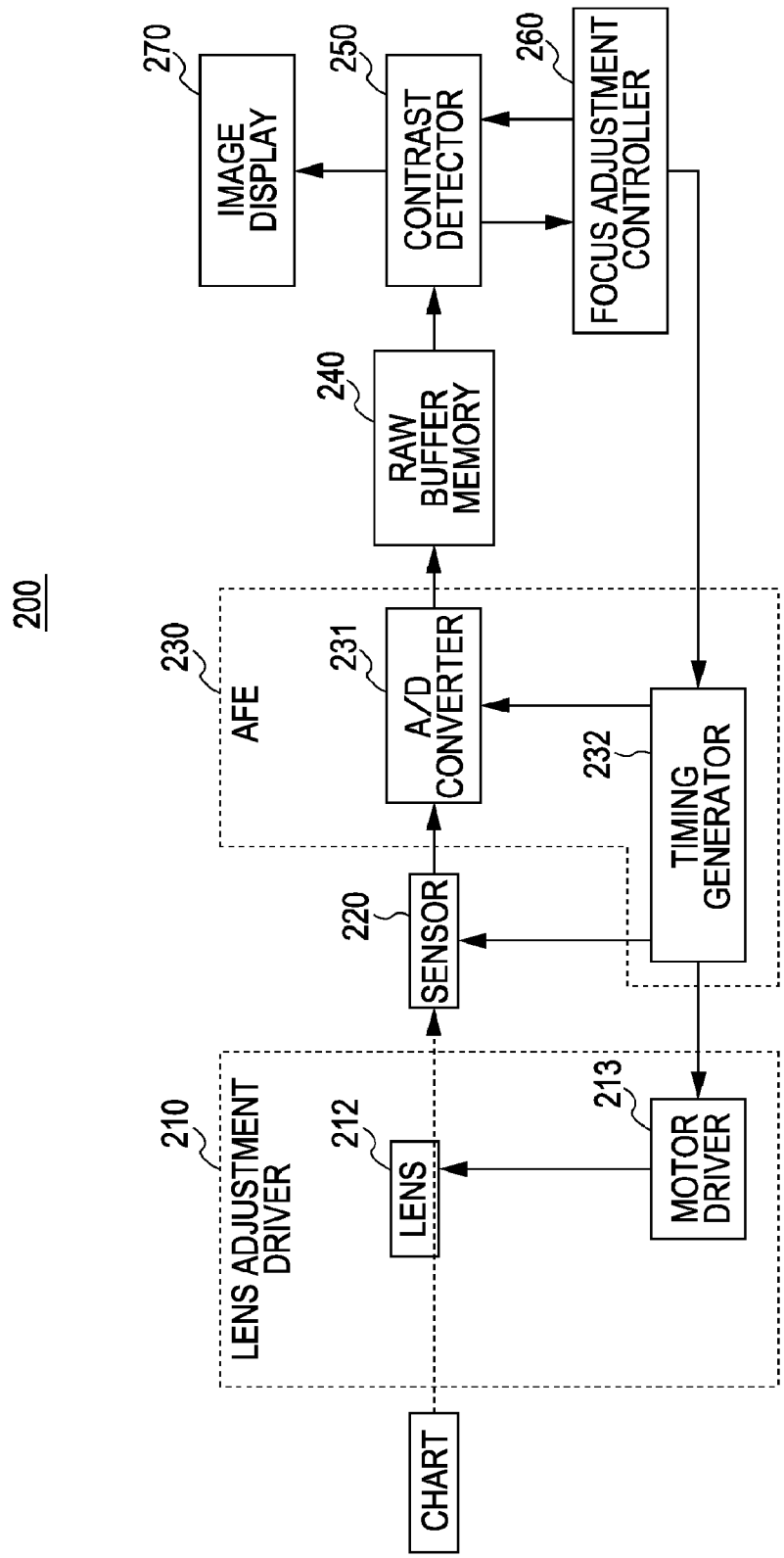
FIG. 9 a block diagram illustrating the structure of an adjusting device according to the embodiment.

In the present embodiment, positions where the element-including optical system 110 and the detector 120 are attached are adjusted by an adjusting device (manufacturing device) 200 shown in FIG. 9 such that a contrast detected in the element-including optical system 110 including the optical wavefront modulation element for modulating the optical transfer function (OTF) becomes equal to or more than a predetermined threshold.

Thus, in the process of assembling the image pickup apparatus 100, the positions where the element-including optical system 110 and the detector 120 are attached are adjusted by making a detected contrast equal to or more than a predetermined threshold so that a normal optical image can be obtained.

As shown in FIG. 9, the adjusting device 200 includes a lens adjustment driver 210, a sensor 220 that corresponds to the detector 120 shown in FIG. 1, an analog front end (AFE) unit 230, a RAW buffer memory 240, a contrast detector 250, a focus adjustment controller 260, and an image display 270.

The lens adjustment driver 210 includes an element-including optical system 211 which has an optical system and an optical wavefront modulation element. A motor driver 212 drives the element-including optical system 211 along an optical axis thereof, thereby setting the lens position at a desired position.

The AFE unit 230 includes a timing generator 232 and an A/D converter 231.

The timing generator 232 is controlled by the focus adjustment controller 260 so as to generate timing for driving a CCD included in the sensor (detector) 220. The A/D converter 231 converts an analog signal input from the CCD into a digital signal, and outputs the thus-obtained digital signal to the RAW buffer memory 240.

The timing generator 232 is also controlled by the focus adjustment controller 260 so as to supply a drive signal for adjusting the position of the element-including optical system 211 relative to the sensor 220 to adjust the focus to the motor driver 213.

The contrast detector 250 measures the contrast on the basis of data stored in the RAW buffer memory 240 while the element-including optical system 211 is at a certain position.

The contrast detector 250 repeatedly detects the contrast of the object based on the image signal while the element-including optical system 211 is being driven.

The focus adjustment controller 260 outputs a control signal for controlling and changing the position of the lens system 212 to the timing generator 232 included in the AFE unit 230 and causes the contrast detector 250 to measure the contrast while the lens system 212 is at the controlled position.

The focus adjustment control is performed by moving the element-including optical system and/or the image pickup device to a focal position corresponding to a predetermined object distance using the contrast (measurement result) obtained by the contrast detector 250.

The focus adjustment controller 260 records a position at which the contrast of the object detected by the contrast detector 250 while the element-including optical system 211 is being driven becomes equal to or less than a predetermined threshold. Then, the element-including optical system 211 is driven in forward and/or backward directions from the recorded position, and is then driven in a direction in which the contrast is increased from the predetermined threshold. Then, the element-including optical system 211 is further driven and a position at which the contrast becomes equal to or less than the predetermined threshold again is recorded. The thus recorded two positions are used to determine the focal position. For example, a midpoint between the two positions can be determined as the focal position. When the focal position is determined, the focus adjustment controller 260, for example, displays a message indicating that the focal position is determined.

The operation of "driving the optical system" refers to an operation of moving a lens along an optical axis, for example, for a normal lens in the optical system. For a liquid lens in the optical system, the operation of "driving the optical system" refers to an operation of applying a voltage to the liquid so that an effect equivalent to that obtained when the normal lens is moved along the optical axis can be obtained.

A portion at which the contrast is detected includes a region where the intensity is high in the point image distribution obtained by the optical wavefront modulation element (phase modulation element). The region where the intensity is high in the point image distribution obtained by the optical wavefront modulation element (phase modulation element) corresponds to a region where the influence of the phase modulation element is small. The "region where the influence of the phase modulation element is small" will be explained below.

Figure 10:
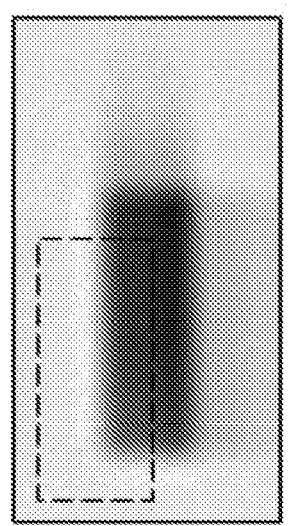
FIG. 10 is a chart image obtained at a focal position.

A chart image shown in FIG. 10 is obtained when, for example, the phase of the phase modulation element is expressed as follows:

$$z=\exp\{ix(\alpha(x^3+y^3)+\beta(x^2y+xy^2)+\chi(x^5+y^5)+\delta(x^4y+xy^4)+\epsilon(x^3y^2+x^2y^3))\}$$

Figure 11:
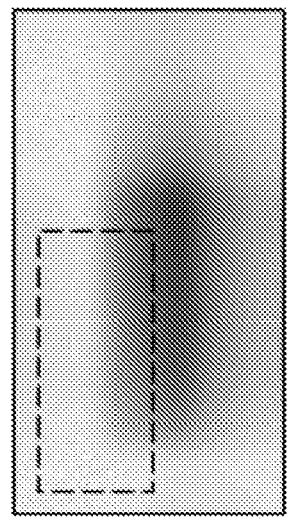
FIG. 11 is a chart image obtained when the optical system is moved by +0.2 mm from the focal position.
Figure 12:
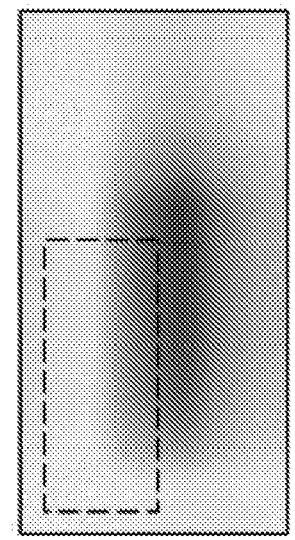
FIG. 12 is a chart image obtained when the optical system is moved by −0.2 mm from the focal position.
Figure 13:
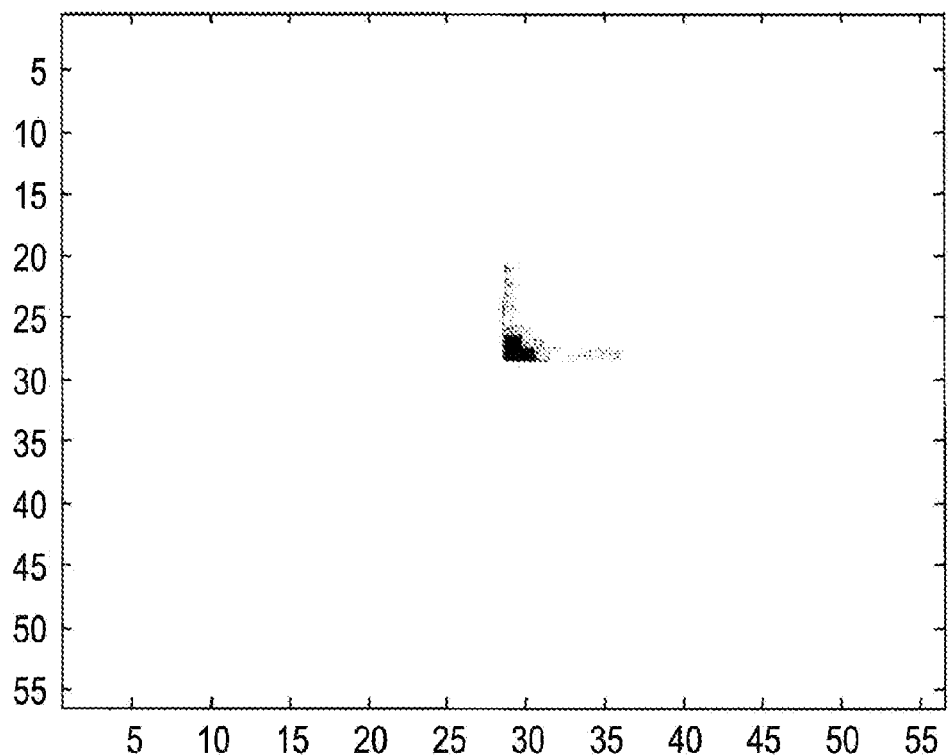
FIG. 13 is a diagram illustrating a point-image distribution function obtained by a phase surface.

$\alpha=-0.00025785$ $\beta=0.0063043$ $\chi=0.039457$ $\delta=-0.019513$ $\epsilon=-0.0086456$ Charts obtained when the optical system is moved by ±0.2 mm are shown in FIGS. 11 and 12. In FIGS. 11 and 12, the "region where the influence of the phase modulation element is small" is surrounded by the dashed lines. When an image of a point light source is obtained using the phase modulation element with the phase expressed as above, an asymmetric image is obtained as shown in FIG. 13. A region other than the region where the image is blurred by the phase modulation element is called the "region where the influence of the phase modulation element is small".

Figure 14:
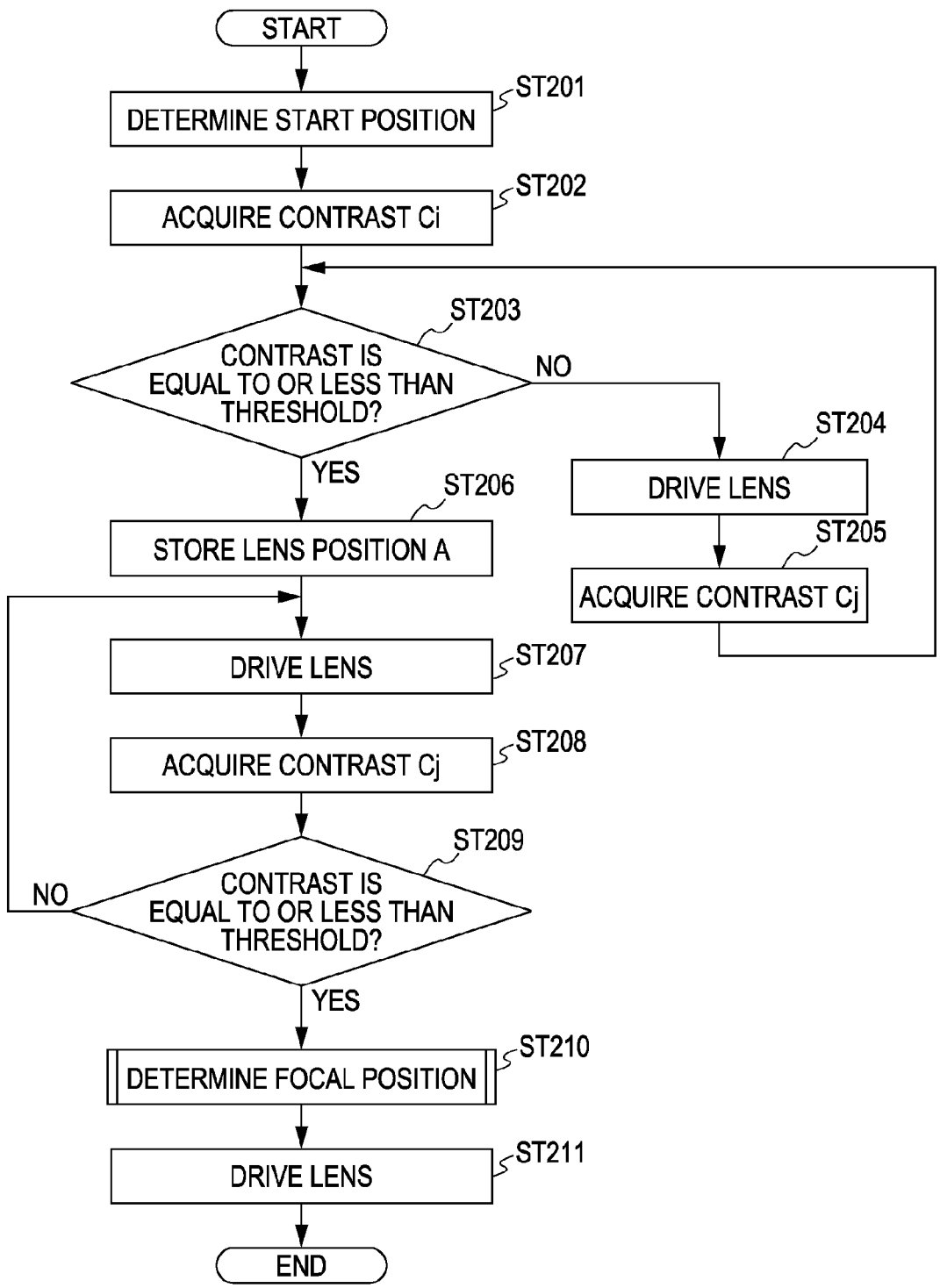
FIG. 14 is a flowchart of a focal-position determining procedure.

Next, a procedure for determining the focal position will be described below with reference to FIGS. 14 and 15.

First, the element-including optical system 211 is attached to an image pickup apparatus.

Figure 15:
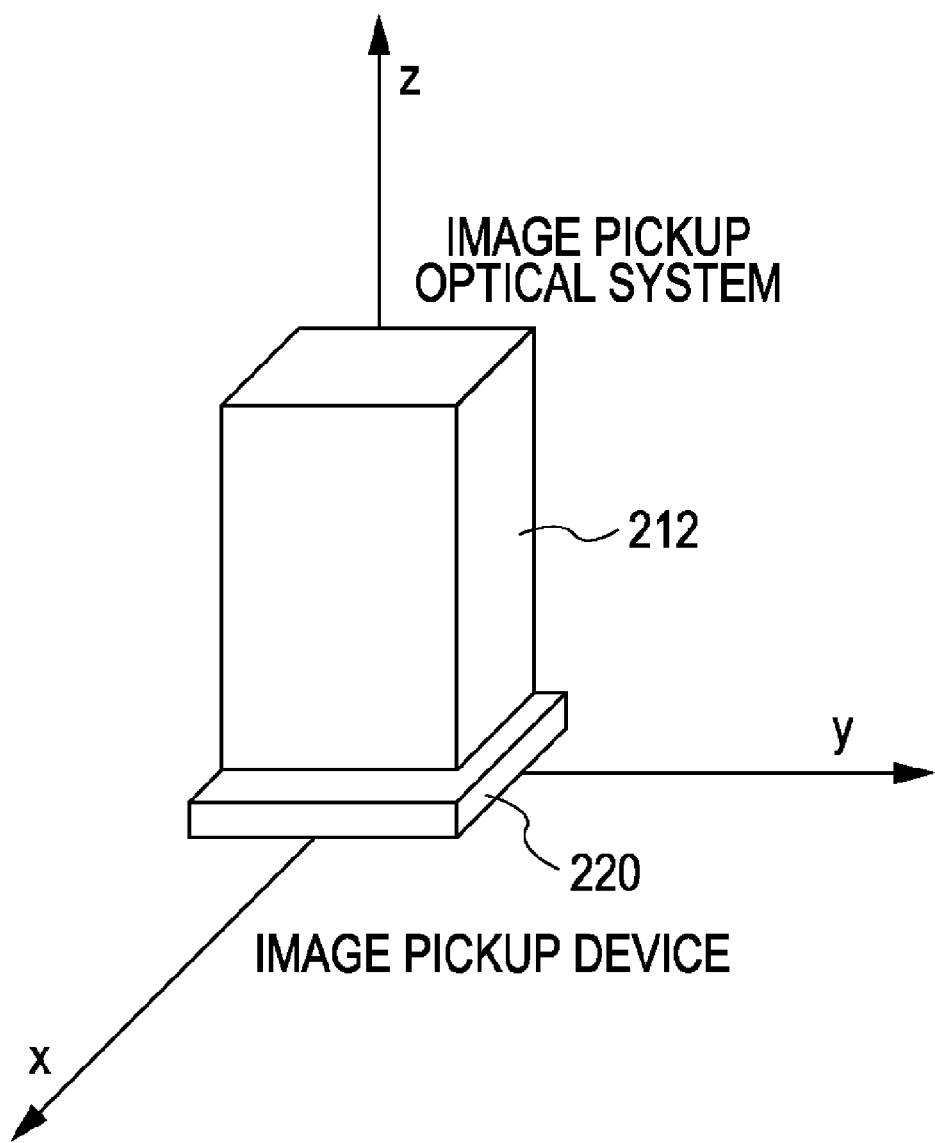
FIG. 15 is a diagram for explaining the focal-position determining procedure and illustrates a process of adjusting positions of the element-including optical system and the detector.

Then, as shown in FIG. 15, the relative positions of the element-including optical system 211 and the sensor 220 are adjusted along x and y axes so that a chart can be taken.

After the position adjustment along the x and y axes, a start position is determined (ST201) and a contrast is measured at that position (ST202).

Then, it is determined whether or not the contrast is equal to or less than the threshold (ST203). If the contrast is more than the threshold, the element-including lens system 212 is driven (ST204) and the contract is measured again (ST205).

If the contrast is equal to or less than the threshold, the position A of the element-including optical system 211 is stored (ST206). Then, the element-including optical system 211 is driven (ST207) and the contrast is measured again (ST208). Then, it is determined whether or not the contrast is equal to or less than the threshold (ST209). If the contrast is more than that threshold, the element-including optical system 211 is driven (ST207) and the contrast is measured again (ST208). If the contrast is equal to or less than the threshold, the focal position is calculated (ST210) and the element-including optical system 211 is driven (ST211).

In the above-described step of driving the element-including optical system 211, the element-including lens system 212 is driven along z axis (optical axis).

As in the present embodiment, similar to the hill-climbing method, the contrast may be repeatedly detected. However, if the detected contrast is equal to or less than the threshold, further driving of the lens may be omitted. In such a case, the processes performed in steps ST206 to ST211 may be omitted. In addition, if the contrast detected first is equal to or less than the threshold, the processes of steps ST204 and ST205 may also be omitted.

Figure 16:
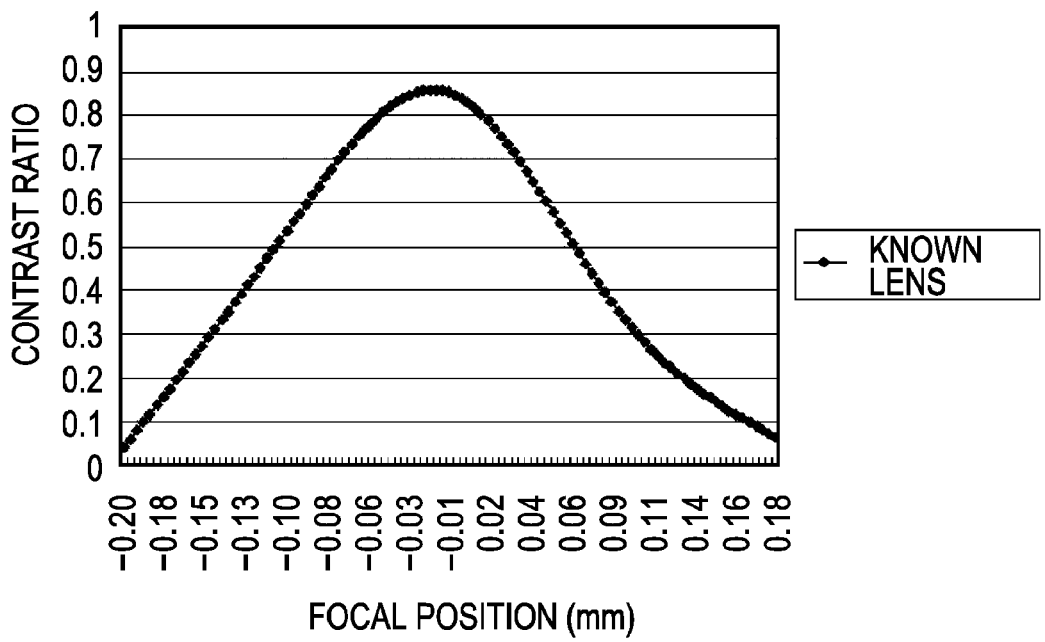
FIG. 16 is a graph showing contrast variation relative to a focal position in a known optical system.
Figure 17:
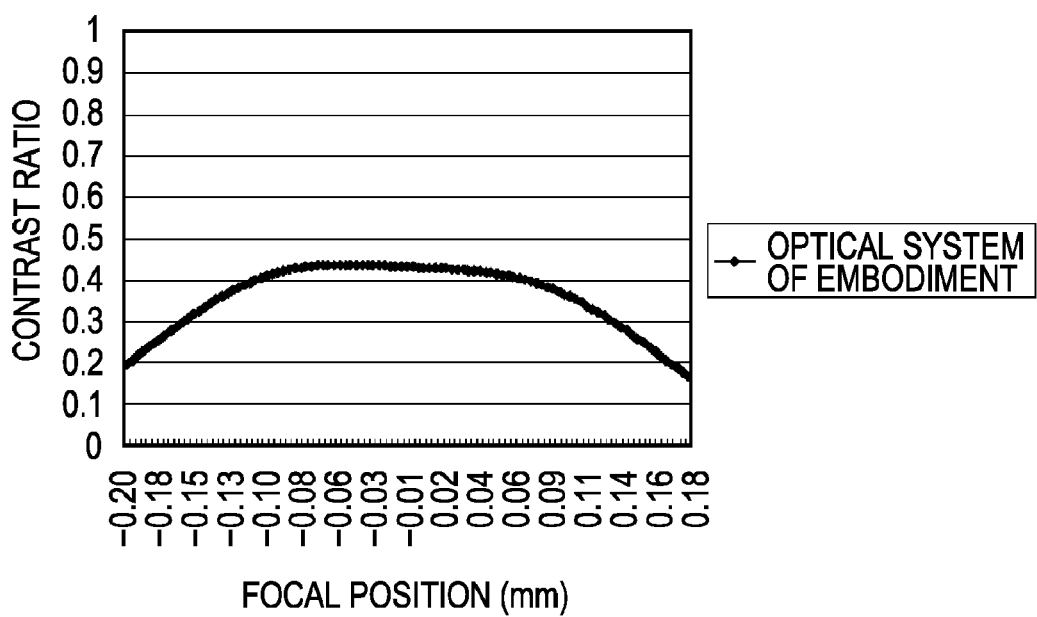
FIG. 17 is a graph showing contrast variation relative to a focal position in an element-including optical system according to the present invention.
Figure 18:
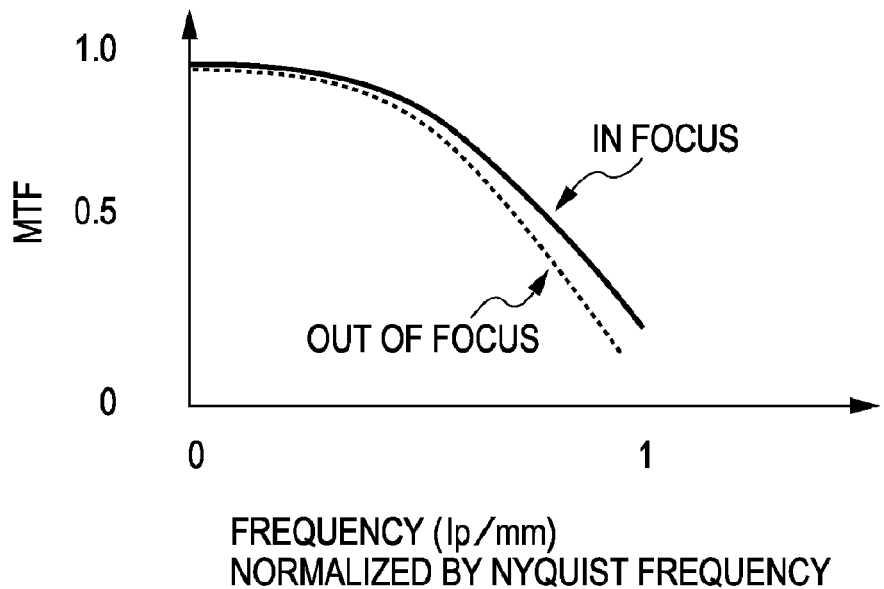
FIG. 18 is a graph illustrating the MTF response obtained in a known optical system.

FIG. 16 shows an example of variation in the contrast value when a known optical system is driven. FIG. 17 shows an example of variation in the contrast value when the element-including optical system according to the present embodiment is driven. In FIGS. 16 and 17, the horizontal axis shows the focal position and the vertical axis shows the contrast ratio. As is clear from FIGS. 16 and 17, compared to the known optical system, in the element-including optical system according to the present embodiment, variation in the contrast is reduced. Accordingly, the focused state can be easily obtained and shooting at the predetermined object distance can be performed.

Figure 19:
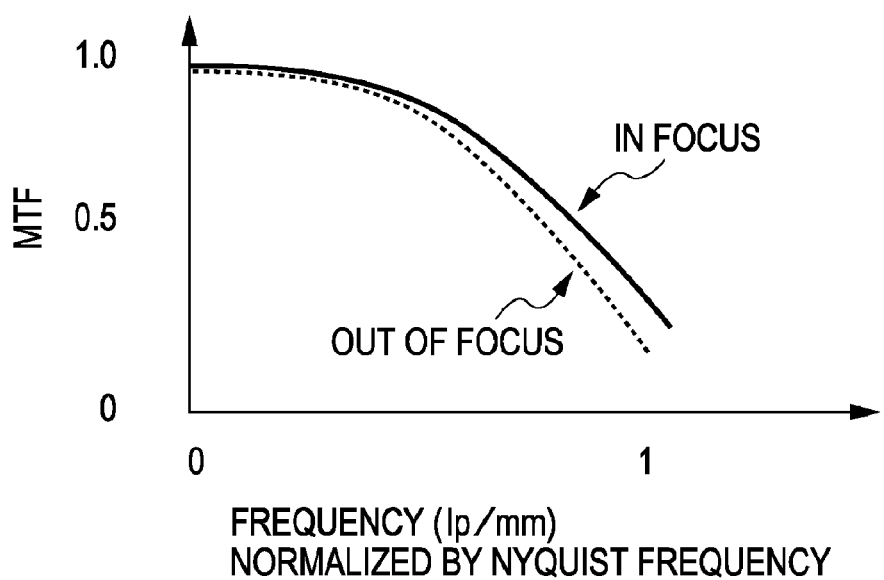
FIG. 19 is a graph illustrating the MTF response obtained in the element-including optical system including an optical wavefront modulation element.

As shown in FIG. 19, the effect of the phase modulation element 113a, that is, phase variation, is reduced and a response similar to that of a known optical system can be obtained. Therefore, as described above, the focal position can be adjusted by adjusting the attachment positions so as to increase the response. When such an adjustment is performed, a larger depth of field can be obtained compared to the case in which the adjustment is not performed.

Figure 20:
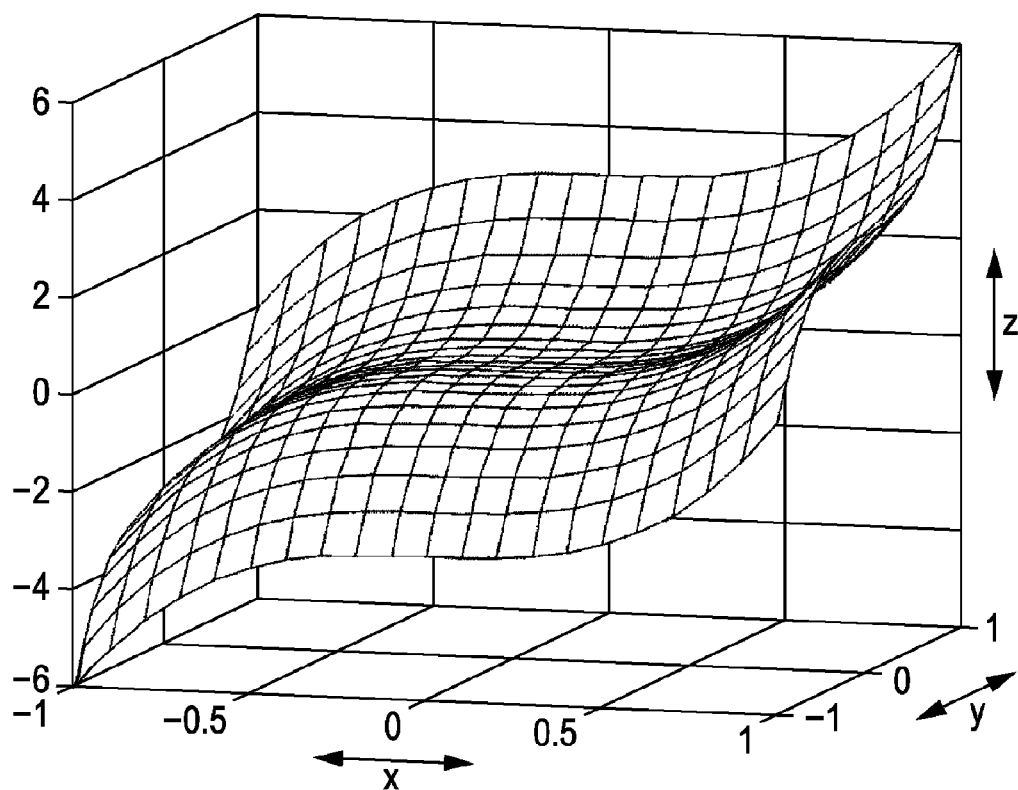
FIG. 20 is a graph illustrating the shape of a wavefront aberration that can be expressed by a certain equation when an optical axis of the element-including optical system including the optical wavefront modulation element is z axis and two axes that are perpendicular to the z axis and to each other are x and y axes.

When the optical axis of the optical system including the optical wavefront modulation element according to the present embodiment is defined as z axis and two axes that are perpendicular to the z axis and to each other are defined as x and y axes, FIG. 20 shows the shape of wavefront aberration that is expressed as follows:

$$Z = \alpha'(x^3 + y^3)$$

where $|x| \leq 1$ and $|y| \leq 1$ are satisfied and Z indicates the wavefront aberration.

In an area where the wavefront aberration is $0.5\lambda$ or less, the phase variation is small and an OTF similar to that of a normal optical system can be obtained. Therefore, the attachment positions are adjusted by stopping down the aperture until the wavefront aberration is reduced to about $0.5\lambda$.

Figure 21:
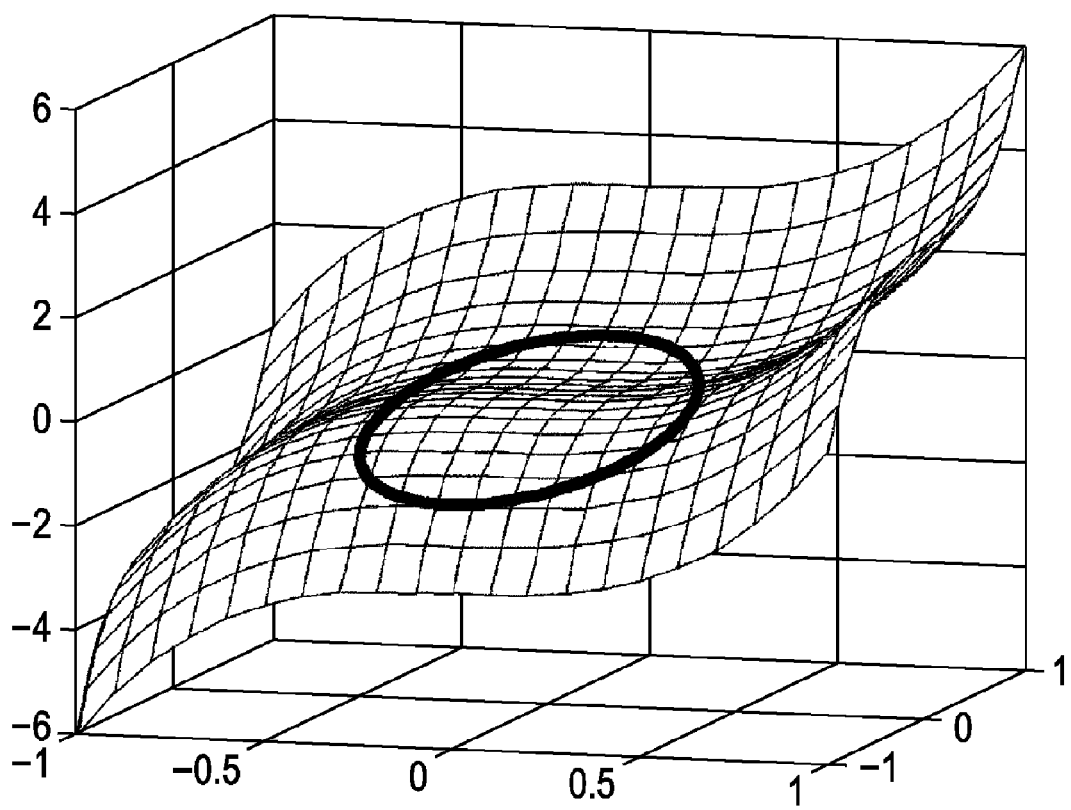
FIG. 21 is a graph illustrates the shape of the wavefront aberration in which the area where the wavefront aberration is 0.5λ or less is circled by a bold line.

FIG. 21 shows the shape of the wavefront aberration in which the area where the wavefront aberration is $0.5\lambda$ or less is circled by the bold line.

In the above description, $\lambda$ is a wavelength in the visible light region or infrared region.

FIG. 20 simply shows an example of the shape of the wavefront aberration, and the present invention is not limited to this as long as the phase can be expressed as follows:

$$z = \exp\left\{ i \times \left( \sum_{j=1} C_j x^m y^n \right) \right\}$$

where m and n are integers and $$j = \frac{[(m+n)^2 + m + 3n]}{2}, \ |x| \leq 1, \ \text{and} \ |y| \leq 1$$

are satisfied, when the optical axis of the optical system is defined as z axis and two axes perpendicular to the z axis and to each other are defined as x and y axes.

As described above, the image processing device 140 receives the first image FIM from the detector 120 and performs a predetermined correction process for lifting the MTF of the first image with respect to the spatial frequency. Accordingly, a final high-definition image FNLIM is generated.

Figure 22:
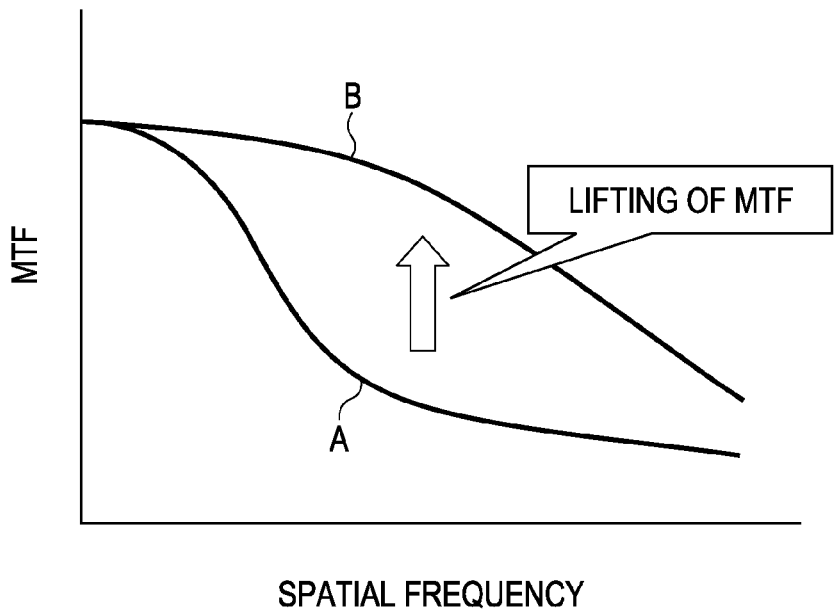
FIG. 22 is a graph for explaining an MTF correction process performed by an image processing device according to the embodiment.

In the MTF correction process performed by the image processing device 140, the MTF of the first image, which is basically low as shown by the curve A in FIG. 22, is changed to an MTF closer to, or the same as, that shown by the curve B in FIG. 22 by performing post-processing including edge emphasis and chroma emphasis using the spatial frequency as a parameter. The characteristic shown by the curve B in FIG. 22 is obtained when, for example, the wavefront shape is not changed using the optical wavefront modulation element as in the present embodiment.

In the present embodiment, all of the corrections are performed using the spatial frequency as a parameter.

Figure 23:
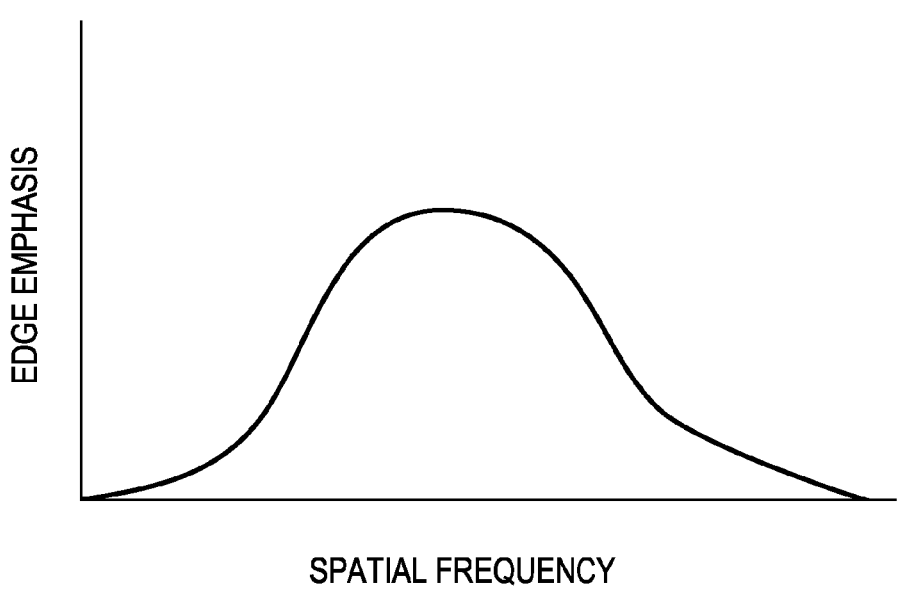
FIG. 23 is another graph for explaining the MTF correction process performed by the image processing device.

In the present embodiment, in order to obtain the final MTF characteristic curve B from the optically obtained MTF characteristic curve A with respect to the special frequency as shown in FIG. 22, the original image (first image) is corrected by performing edge emphasis or the like for each spatial frequency. For example, the MTF characteristic shown in FIG. 22 is processed with an edge emphasis curve with respect to the spatial frequency shown in FIG. 23.

More specifically, in a predetermined spatial frequency range, the degree of edge emphasis is reduced at a low-frequency side and a high-frequency side and is increased in an intermediate frequency region. Accordingly, the desired MTF characteristic curve B can be virtually obtained.

As described above, basically, the image pickup apparatus 100 according to the present embodiment includes the element-including optical system 110 and the detector 120 for obtaining the first image. In addition, the image pickup apparatus 100 also includes the image processing device 140 for forming the final high-definition image from the first image. The element-including optical system 110 is provided with an optical wavefront modulation element or an optical element, such as a glass element and a plastic element, having a surface processed so as to perform wavefront formation, so that the wavefront of light can be changed (modulated). The light with the modulated wavefront forms an image, i.e., the first image, on the imaging plane (light-receiving surface) of the detector 120 including a CCD or a CMOS sensor. The image pickup apparatus 100 according to the present embodiment is characterized in that the image pickup apparatus 100 functions as an image-forming system that can obtain a high-definition image from the first image through the image processing device 140.

In the present embodiment, the first image obtained by the detector 120 is in light conditions with an extremely large depth. Therefore, the MTF of the first image is basically low, and is corrected by the image processing device 140.

The image-forming process performed by the image pickup apparatus 100 according to the present embodiment will be discussed below from the wave-optical point of view.

When a spherical wave emitted from a single point of an object passes through an imaging optical system, the spherical wave is converted into a convergent wave. At this time, aberrations are generated unless the imaging optical system is an ideal optical system. Therefore, the wavefront shape is changed into a complex shape instead of a spherical shape. Wavefront optics is the science that connects geometrical optics with wave optics, and is useful in dealing with the phenomenon of wavefront.

When the wave-optical MTF at the focal point is considered, information of the wavefront at the exit pupil position in the imaging optical system becomes important.

The MTF can be calculated by the Fourier transform of wave-optical intensity distribution at the focal point. The wave-optical intensity distribution is obtained as a square of wave-optical amplitude distribution, which is obtained by the Fourier transform of a pupil function at the exit pupil.

The pupil function is the wavefront information (wavefront aberration) at the exit pupil position. Therefore, the MTF can be calculated if the wavefront aberration of the optical system 110 can be accurately calculated.

Accordingly, the MTF value at the imaging plane can be arbitrarily changed by changing the wavefront information at the exit pupil position by a predetermined process. Also in the present embodiment in which the wavefront shape is changed using the optical wavefront modulation element, desired wavefront formation is performed by varying the phase (the light path length along the light beam). When the desired wavefront formation is performed, light output from the exit pupil forms an image including portions where light rays are dense and portions where light rays are sparse, as is clear from the geometrical optical spot images shown in FIGS. 7A to 7C. In this state, the MTF value is low in regions where the spatial frequency is low and an acceptable resolution is obtained in regions where the spatial frequency is high. When the MTF value is low, in other words, when the above-mentioned geometrical optical spot images are obtained, aliasing does not occur. Therefore, it is not necessary to use a low-pass filter.

Then, flare images, which cause the reduction in the MTF value, are removed by the image processing device 140 including the DSP or the like. Accordingly the MTF value can be considerably increased.

Next, an MTF response of the present embodiment and that of a known optical system will be discussed below.

Figure 24:
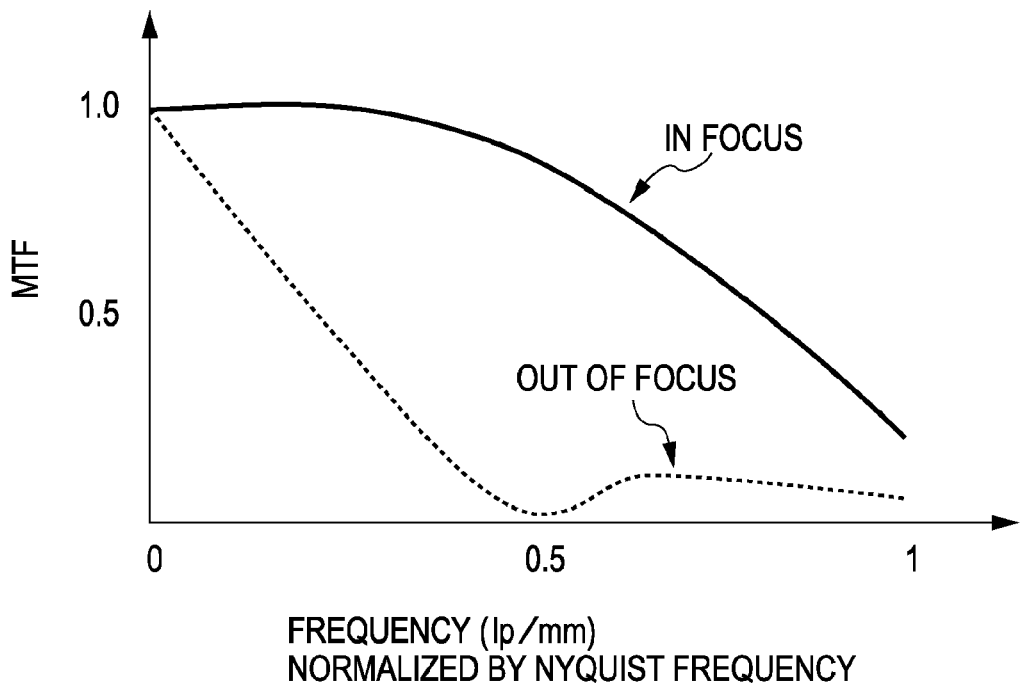
FIG. 24 is a graph illustrating the MTF response obtained when an object is in focus and when the object is out of focus in the known optical system.
Figure 25:
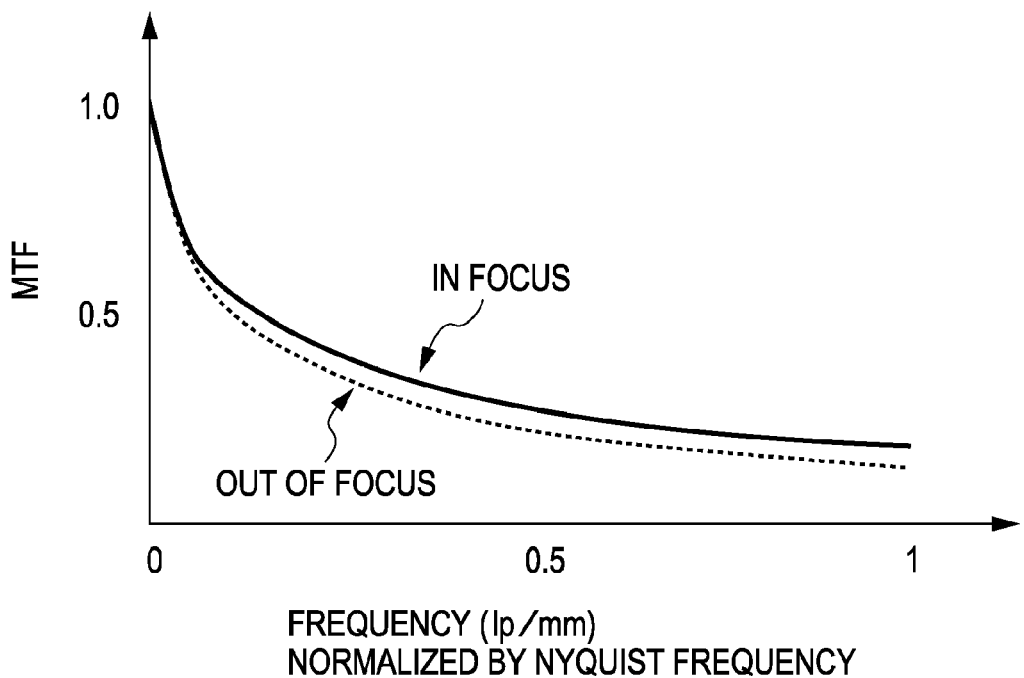
FIG. 25 is a graph illustrating the MTF response obtained when an object is in focus and when the object is out of focus in the element-including optical system including the optical wavefront modulation element according to the embodiment.
Figure 26:
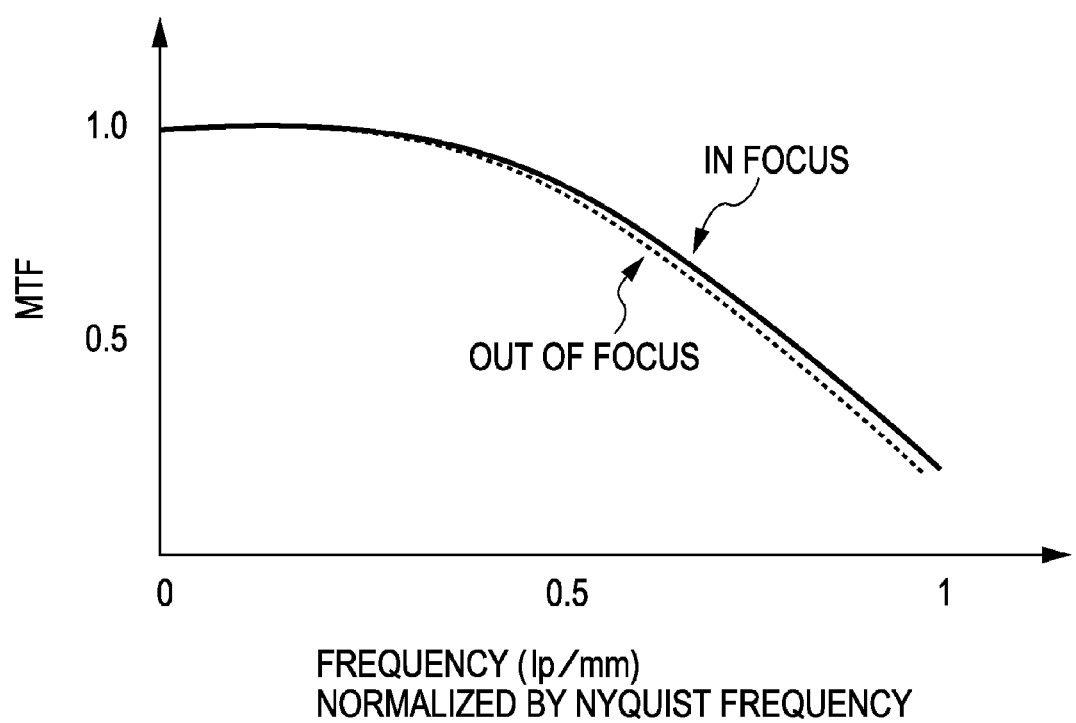
FIG. 26 is a graph illustrating the MTF response obtained after data reconstruction in the image pickup apparatus according to the embodiment.

As shown in FIGS. 24, 25, and 26, in the element-including optical system including the optical wavefront modulation element, variation in the MTF response obtained when the object is out of focus is smaller than that in an optical system free from the optical wavefront modulation element. The MTF response is increased by subjecting the image formed by the element-including optical system including the optical wavefront modulation element to a process using a convolution filter.

The OTF (MTF) value is preferably 0.1 or more at the Nyquist frequency shown in FIG. 25. The reason for this will be described below. In order to obtain the OTF shown in FIG. 25 after reconstruction, the gain is increased by the reconstruction filter. However, at this time, the sensor noise is also increased. Therefore, preferably, reconstruction is performed without largely increasing the gain in a high-frequency range around the Nyquist frequency.

In a normal optical system, sufficient resolution can be obtained if the MTF value at the Nyquist frequency is 0.1 or more.

Therefore, if the MTF value is 0.1 or more before reconstruction, it is not necessary to increase the gain at the Nyquist frequency by the reconstruction filter and the reconstructed image is not largely influenced by noise.

The structure of the image processing device 140 and processes performed thereby will be described below.

As shown in FIG. 1, the image processing device 140 includes a RAW buffer memory 141, a convolution operator 142, the kernel data storage ROM 143 that functions as memory means, and a convolution controller 144.

The convolution controller 144 in the image processing device 140 is controlled by the controller 190 so as to turn on/off the convolution process, control the screen size, and switch kernel data.

The image processing device 140 includes the ROM 143 that functions as a memory for storing reconstruction filter information, such as kernel data, that is selected in advance. The blurred object-image signal is subjected to the reconstruction filtering process using the reconstruction filter information stored in the ROM 143. The reconstruction filter information stored in the ROM 143 is selected from one or a plurality of pieces of reconstruction filter information using which, of images reconstructed using reconstruction filters, an image that satisfy a predetermined evaluation criterion can be obtained.

A method for selecting (determining) the reconstruction filter information, such as kernel data, stored in the ROM 143 will be explained below.

Figure 27:
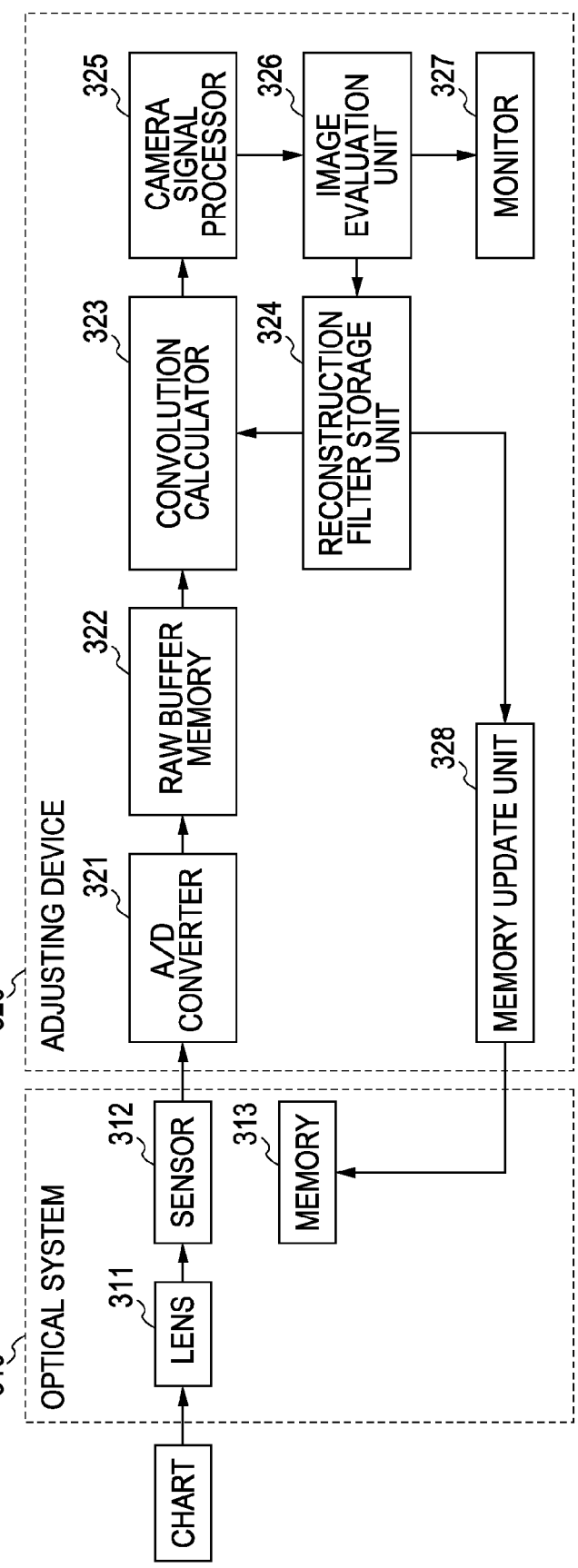
FIG. 27 is a block diagram illustrating the structure of an adjusting device (manufacturing device) for selecting reconstruction filter information according to the embodiment.

FIG. 27 is a block diagram illustrating the structure of an adjusting device (manufacturing device) for selecting the reconstruction filter information according to the present embodiment.

Referring to FIG. 27, an adjusting device includes an optical system 310 and a filtering process selector 320.

The optical system 310 includes a lens 311 and a sensor (detector) 312 that are subjected to focus adjustment and the like by the adjusting device 200 shown in FIG. 9. In addition, the optical system 310 also includes a memory (or register) 313 which stores the reconstruction filter information selected by the filtering process selector 320. The reconstruction filter information stored in the memory 313 is changed in accordance with manufacturing and assembling variations in lenses and/or sensors.

For example, when the image pickup apparatus 100 shown in FIG. 1 is manufactured (assembled) using the optical system 310, one or more pieces of reconstruction filter information stored in the memory 313 are loaded into the ROM 143 included in the image processing device 140.

The filtering process selector 320 includes an A/D converter 321, a RAW buffer memory 322, a convolution operator 323 that functions as an operation unit, a reconstruction filter storage unit 324, a camera signal processor 325, an image evaluation unit 326, a monitor (display unit) 327, and a memory update unit 328.

In this filtering process selector 320, the structure including the RAW buffer memory 322, the convolution operator 323, the reconstruction filter storage unit 324, and the image evaluation unit 326 is similar to that of the image processing device 140 shown in FIG. 1.

The reconstruction filter storage unit 324 stores a plurality of pieces of reconstruction filter information and supplies certain reconstruction filter information to the convolution operator 323 under the instructions of the image evaluation unit 326. In addition, the reconstruction filter storage unit 324 supplies the selected (determined) reconstruction filter information to the memory update unit 328.

In the filtering process selector 320 having the above-described structure, reconstruction of a chart image captured by the optical system 310 is performed by the convolution operator 323 using a first reconstruction filter stored in the reconstruction filter storage unit 324. Then, the thus-reconstructed image is supplied to the camera signal processor 325, and is then evaluated by the image evaluation unit 326.

If the image satisfies a predetermined evaluation criterion, the memory update unit 328 updates the memory 313 in the optical system 310, thereby determining the reconstruction filter.

If the image does not satisfy the predetermined evaluation criterion, the convolution operator 323 reconstructs an image using a second reconstruction filter stored in the reconstruction filter storage unit 324. Then, the reconstructed image is supplied to the camera signal processor 325, and is then evaluated by the image evaluation unit 326. The above-described steps are repeated until the predetermined evaluation criterion is satisfied. When the predetermined evaluation criterion is satisfied, the memory 313 of the optical system 310 is updated.

Figure 28:
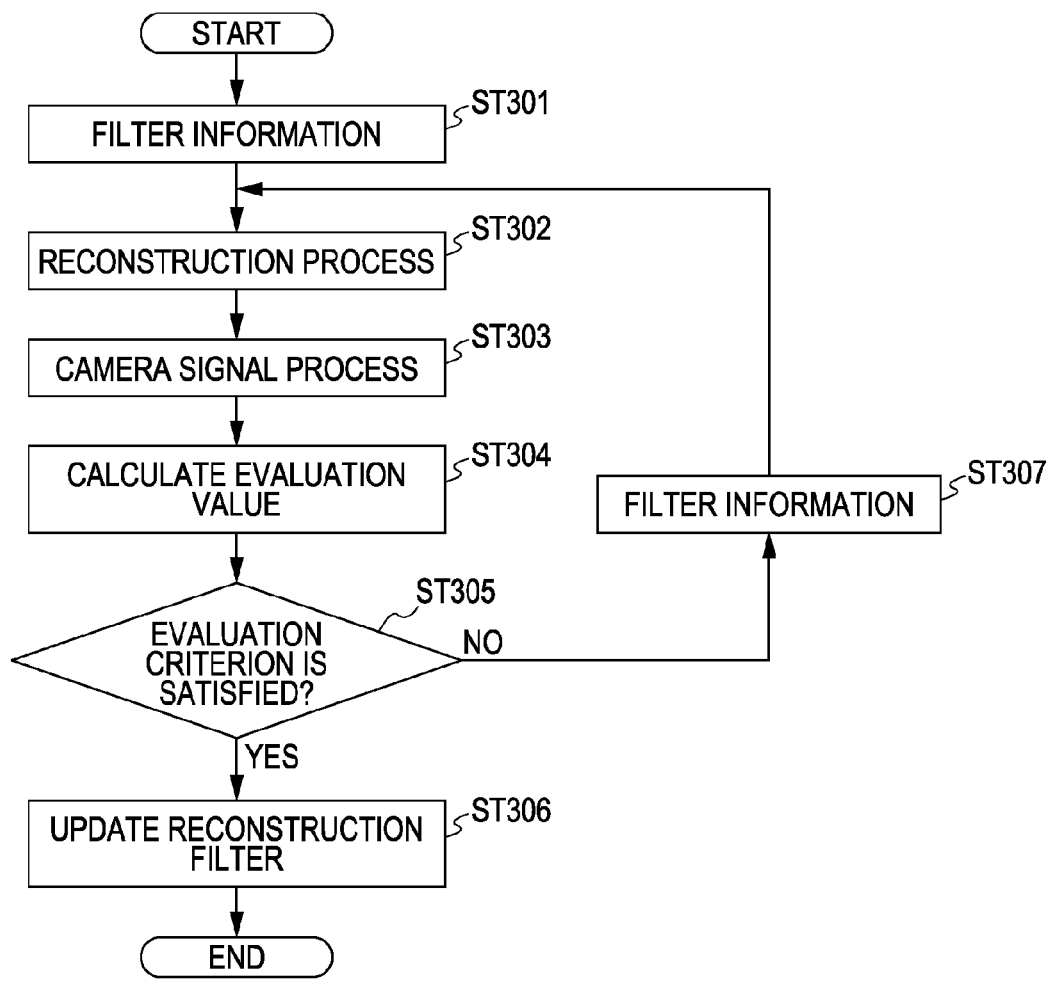
FIG. 28 is a flowchart of a main process performed by a filtering process selector included in the adjusting device shown in FIG. 27.

FIG. 28 is a flowchart of a main process performed by the filtering process selector 320 included in the adjusting device shown in FIG. 27. First, a reconstruction filter is selected from the reconstruction filter storage unit 324 (ST301).

Next, the convolution operator 323 performs a reconstruction process using the selected reconstruction filter information (ST302). Then, the camera signal processor 325 performs color interpolation, white balancing, YCbCr conversion, compression, etc. (ST303). Then, the image evaluation unit 326 evaluates the image obtained by the camera signal processor 325. If a predetermined evaluation criterion is satisfied, the reconstruction filter information stored in the memory of the optical system is updated (ST304 to ST306).

If the predetermined evaluation criterion is not satisfied in step ST305, steps of changing the reconstruction filter information (ST307), performing the reconstruction process and the camera signal process, and calculating an evaluation value are repeated until the evaluation criterion is satisfied. The evaluation value calculated in step ST304 is, for example, MTF, resolution (TV lines), or contrast (difference between maximum and minimum brightness for an image) in an evaluation area.

In the flowchart shown in FIG. 28, when a reconstruction filter using which satisfies the evaluation criterion is found, the reconstruction filter information is immediately updated to the thus-found reconstruction filter. However, the reconstruction filter may also be updated in the following manner.

1) First, evaluation values are determined for all or a predetermined number of reconstruction filters, and the best reconstruction filter of the reconstruction filters that satisfy the evaluation criterion is selected. Then, the reconstruction filter is updated to the selected reconstruction filter.

2) First, evaluation values are determined for all or a predetermined number of reconstruction filters, and reconstruction filters that satisfy the evaluation criterion are extracted. Then, the reconstruction filter is updated to one of the extracted reconstruction filters.

Next, an example of simulation of the manufacturing and/or assembling variation in lenses and/or sensors will be described. Parameters of the variation include curvature, thickness, refractive index, and eccentricity of the lens, air gaps and eccentricity between lenses, eccentricity of the lens unit, eccentricity and rotation of the lens relative to the sensor, etc. The variation simulation is performed by giving an expected amount of variations for each of the parameters. The simulation accuracy can be increased by using accurate amounts of variations and increasing the number of samples.

The reconstruction filters include, for example, filters FLT1, FLT2, and FLT3. In the filter FLT1, the OTFs of lenses having variation are averaged. In the filter FLT2, the OTFs of lenses that do not satisfy the evaluation criterion even after reconstruction using the filter FLT1 are averaged. In the filter FLT3, the OTFs of lenses that do not satisfy the evaluation criterion even after the reconstruction using the filter FLT2 are averaged.

Figure 29:
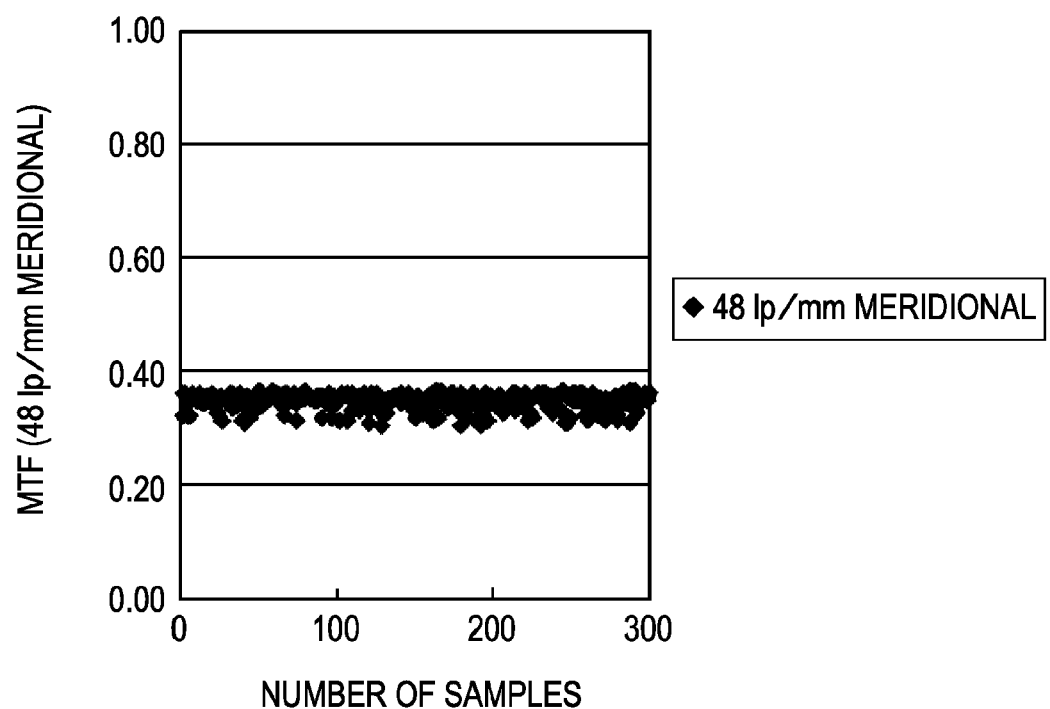
FIG. 29 is a distribution diagram of MTF calculated on the basis of variation simulation (MTF in the meridional direction at 48 lp/mm at the center).
Figure 30:
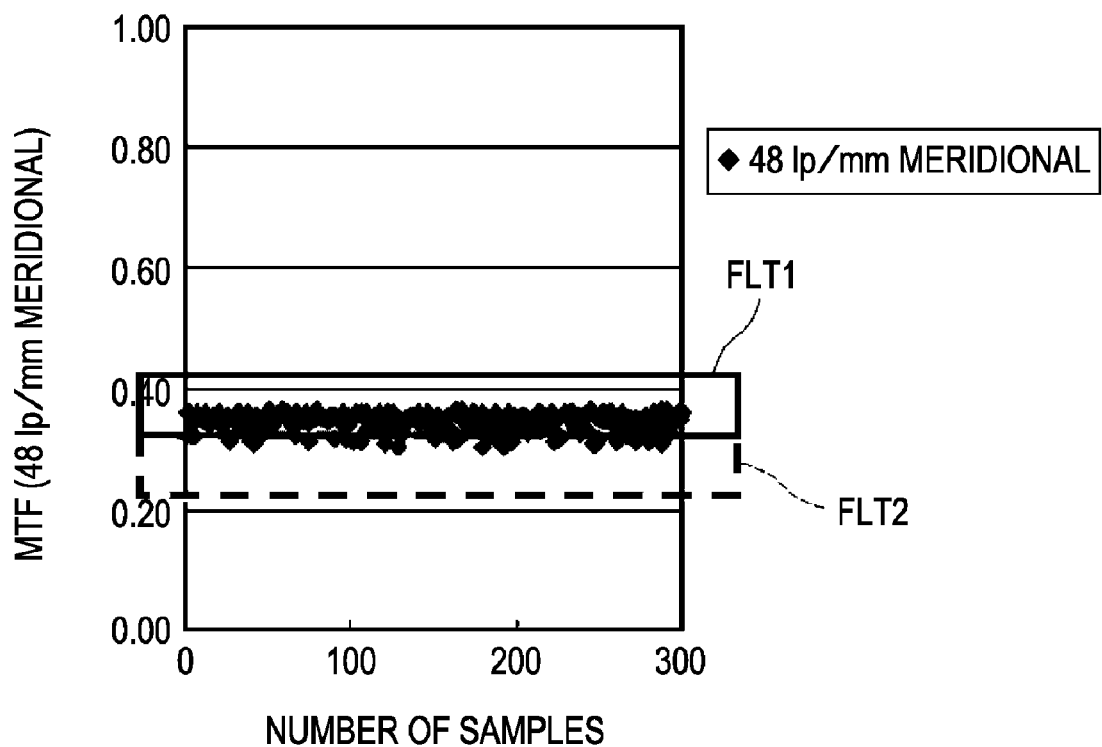
FIG. 30 is a diagram illustrating a reconstruction process in which filters are used in association with the MTF distribution calculated on the basis of the variation simulation.

FIG. 29 is a distribution diagram of MTF calculated on the basis of the variation simulation (MTF in the meridional direction at 48 lp/mm at the center). FIG. 30 is a diagram illustrating a reconstruction process in which filters are used in association with the MTF distribution calculated on the basis of the variation simulation.

In FIGS. 29 and 30, the horizontal axis shows the number of samples and the vertical axis shows the MTF. The reconstruction filter may also be selected in accordance with the variation in the OTF.

Referring to FIG. 30, different filters are used depending on whether the MTF is no less than a predetermined value or is less than the predetermined value. The quality of the reconstructed image can be improved by reducing the difference between the predetermined values to be set.

Figures 33, 34:
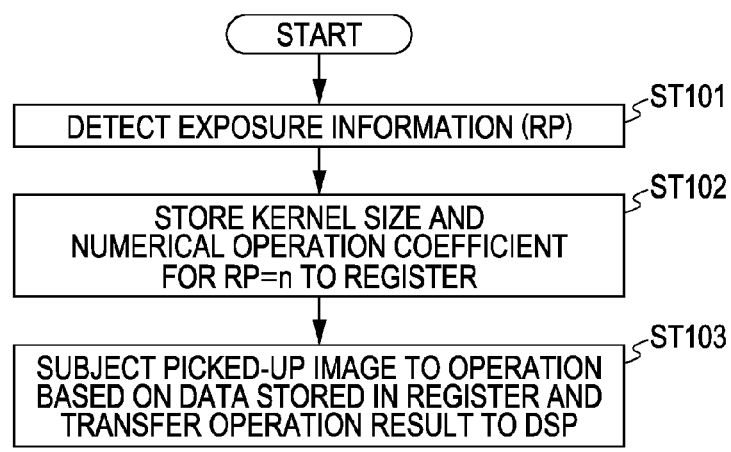
FIG. 33 is a diagram illustrating another example of data stored in a kernel data ROM (object distance).
FIG. 34 is a flowchart of an optical-system setting process performed by an exposure controller.

As shown in FIGS. 31, 32, and 33, the kernel data storage ROM 143 stores kernel data for the convolution process that are calculated in advance on the basis of the PSF in of the optical system. The kernel data storage ROM 143 acquires exposure information, which is determined when the exposure settings are made by the controller 190, and the kernel data is selected through the convolution controller 144.

The exposure information includes aperture information.

In the example shown in FIG. 31, kernel data A corresponds to an optical magnification of 1.5, kernel data B corresponds to an optical magnification of 5, and kernel data C corresponds to an optical magnification of 10.

In the example shown in FIG. 32, kernel data A corresponds to an F number, which is the aperture information, of 2.8, and kernel data B corresponds to an F number of 4. The F numbers 2.8 and 4 are out of the above-described area where the wavefront aberration is 0.5λ or less.

In the example shown in FIG. 33, kernel data A corresponds to an object distance of 100 mm, kernel data B corresponds to an object distance of 500 m, and kernel data C corresponds to an object distance of 4 m.

The filtering process is performed in accordance with the aperture information, as in the example shown in FIG. 28, for the following reasons.

That is, when the aperture is stopped down to shoot an object, the phase plate 113a that functions as the optical wavefront modulation element is covered by the aperture stop. Therefore, the phase is changed and suitable image reconstruction cannot be performed.

Therefore, according to the present embodiment, a filtering process corresponding to the aperture information included in the exposure information is performed as in this example, so that suitable image reconstruction can be performed.

FIG. 34 is a flowchart of a switching process performed by the controller 190 in accordance with the exposure information including the aperture information.

First, exposure information (RP) is detected (ST101), and is supplied to the convolution controller 144.

The convolution controller 144 sets the kernel size and the numerical coefficient in a register on the basis of the exposure information RP (ST102).

The image data obtained by the detector 120 and input to the two-dimensional convolution operator 142 through the AFE unit 130 is subjected to the convolution operation based on the data stored in the register. Then, the data obtained by the operation is transmitted to the signal processor 150 (ST103).

The signal processor 150 and the kernel data storage ROM 143 of the image processing device 140 will be described in more detail below.

FIGS. 35 to 38 are block diagrams illustrating first to fourth examples of the image processing device 140. For simplicity, the AFE unit and the like are omitted. These examples correspond to the case in which filter kernel data is prepared in advance in association with the exposure information.

Figure 35:
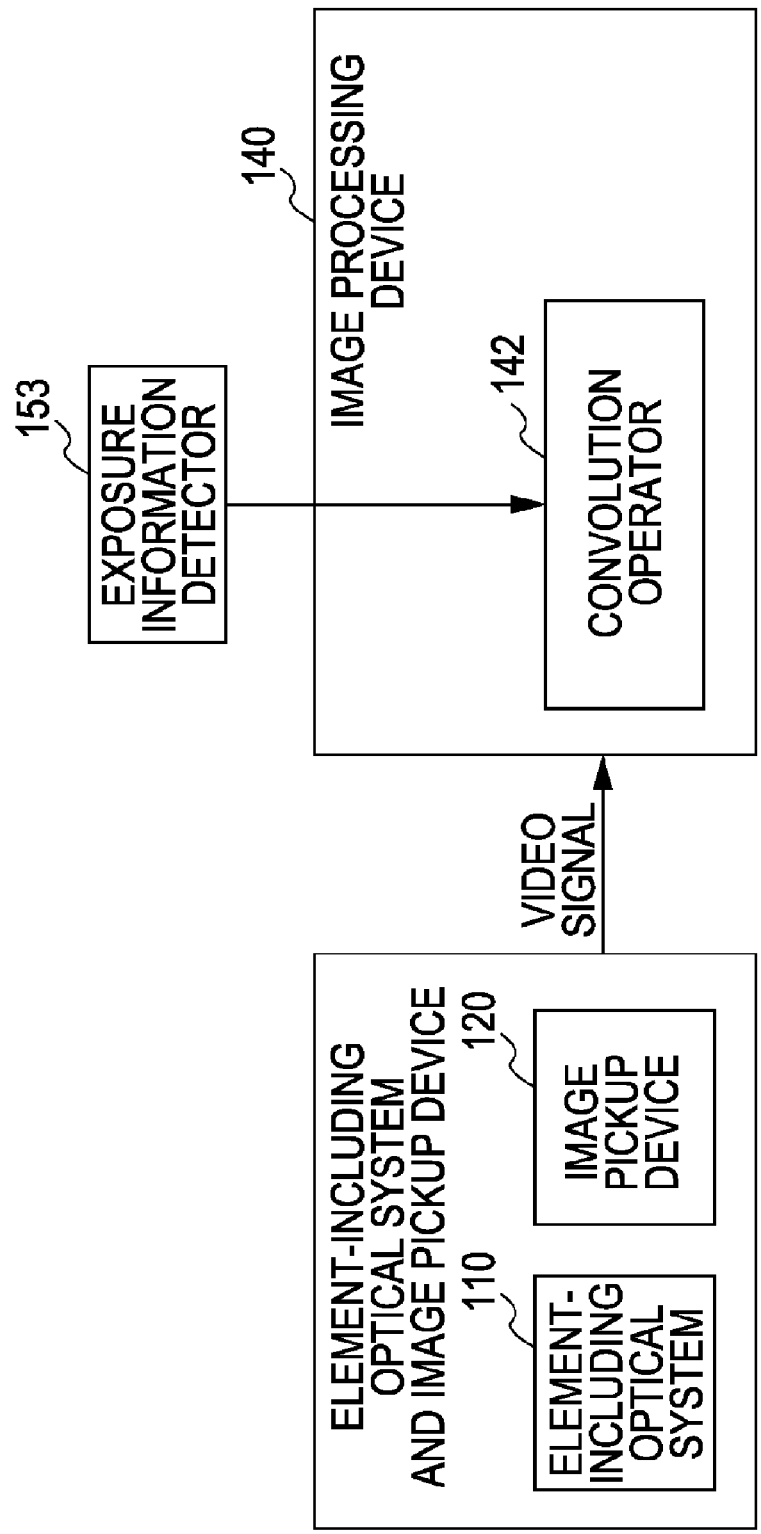
FIG. 35 illustrates a first example of the structure including a signal processor and a kernel data storage ROM.

Referring to FIG. 35, the image processing device 140 receives the exposure information that is determined when the exposure settings are made from an exposure information detector 153 and selects kernel data through the convolution controller 144. The two-dimensional convolution operator 142 performs the convolution process using the kernel data.

Figure 36:
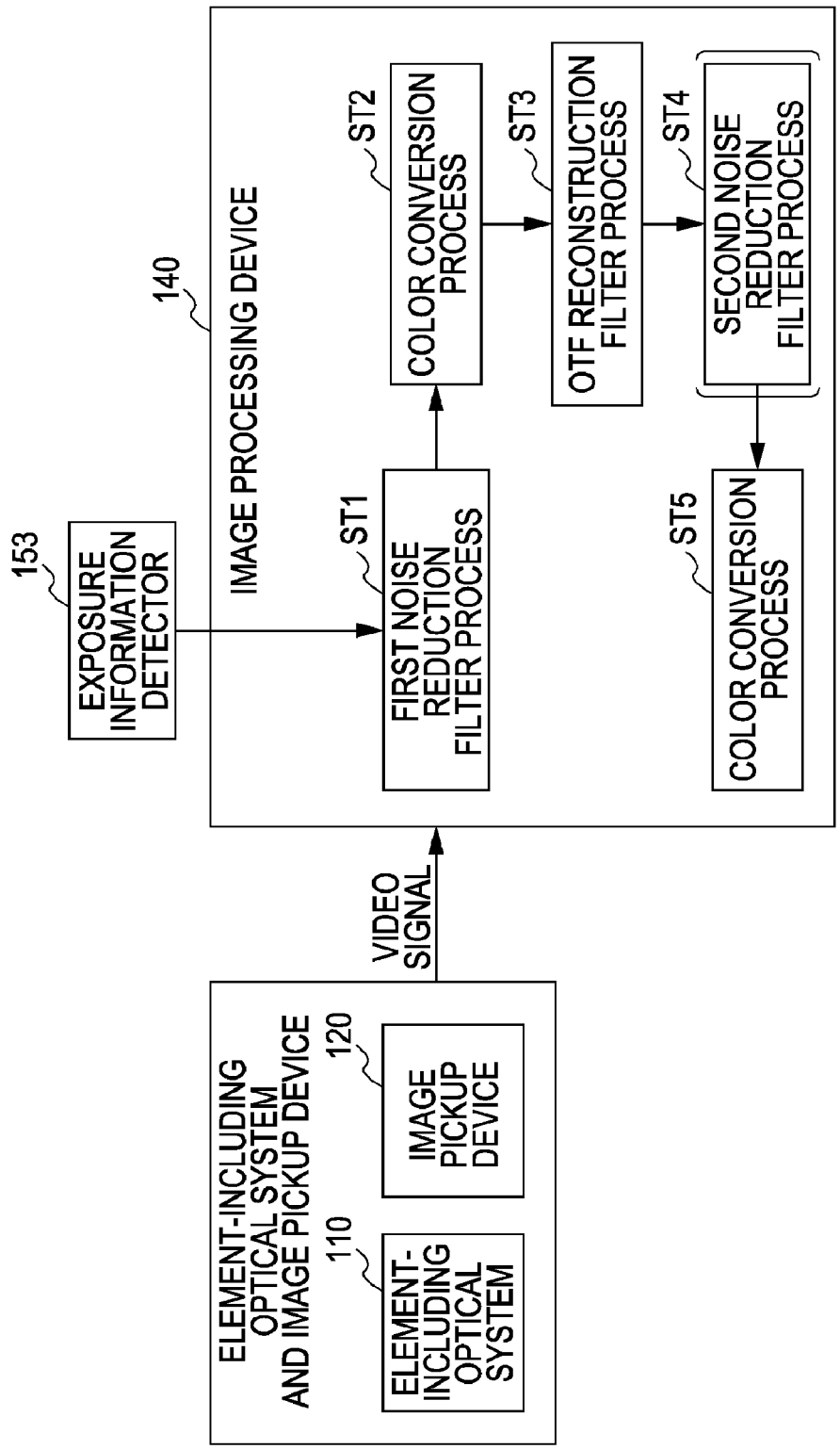
FIG. 36 illustrates a second example of the structure including a signal processor and a kernel data storage ROM.

In the example shown in FIG. 36, the image processing device 140 performs a first noise-reduction filtering process ST1. The first noise-reduction filtering process ST1 is prepared in advance as the filter kernel data in association with the exposure information.

The exposure information determined when the exposure settings are made is detected by the exposure information detector 153 and the kernel data is selected through the convolution controller 144.

After the first noise-reduction filtering process ST1, the two-dimensional convolution operator 142 performs a color conversion process ST2 for converting the color space and then performs the convolution process (OTF reconstruction filtering process) ST3 using the kernel data.

Then, a second noise-reduction filtering process ST4 is performed and the color space is returned to the original state by a color conversion process ST5. The color conversion processes may be, for example, YCbCr conversion. However, other kinds of conversion processes may also be performed.

The second noise-reduction filtering process ST4 may be omitted.

Figure 37:
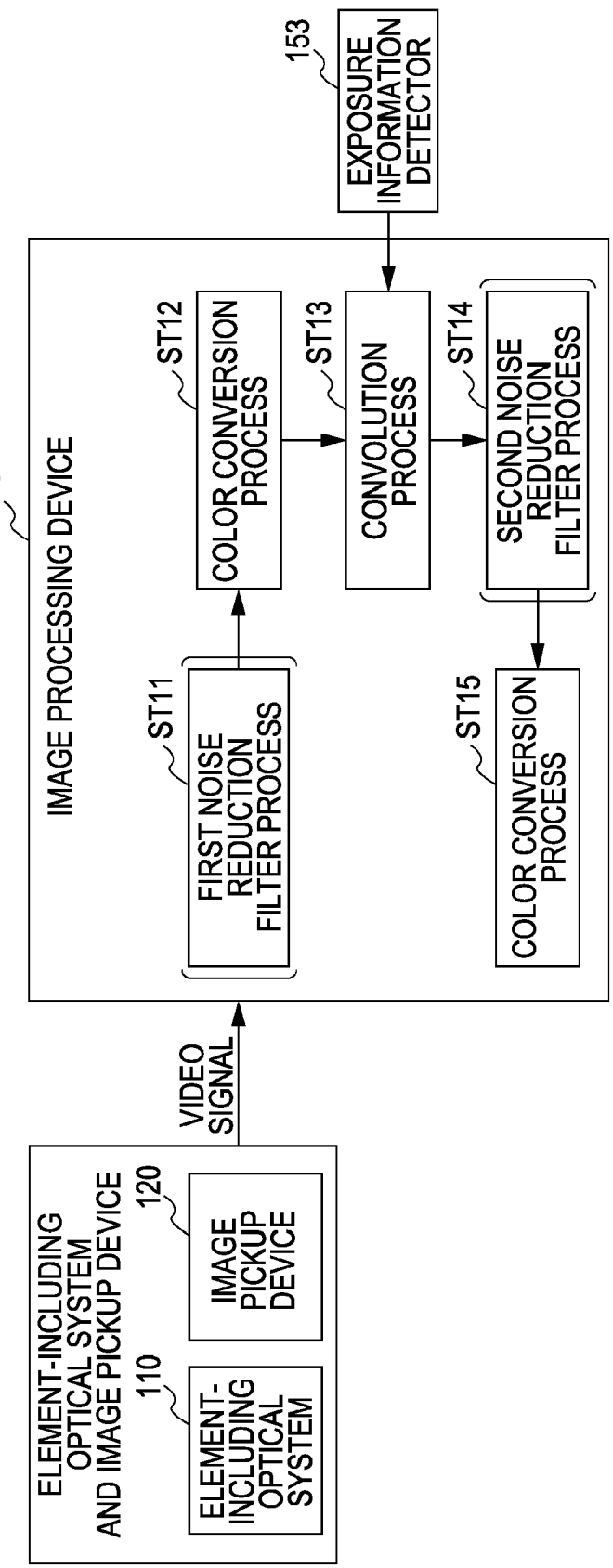
FIG. 37 illustrates a third example of the structure including a signal processor and a kernel data storage ROM.

FIG. 37 is a block diagram illustrating the case in which an OTF reconstruction filter is prepared in advance in association with the exposure information.

The exposure information determined when the exposure settings are made is obtained by the exposure information detector 153 and the kernel data is selected through the convolution controller 144.

After a first noise-reduction filtering process ST11 and a color conversion process ST12, the two-dimensional convolution operator 142 performs a convolution process ST13 using the OTF reconstruction filter.

Then, a second noise-reduction filtering process ST14 is performed and the color space is returned to the original state by a color conversion process ST15. The color conversion processes may be, for example, YCbCr conversion. However, other kinds of conversion processes may also be performed.

One of the first and second noise-reduction filtering processes ST11 and ST14 may also be omitted.

Figure 38:
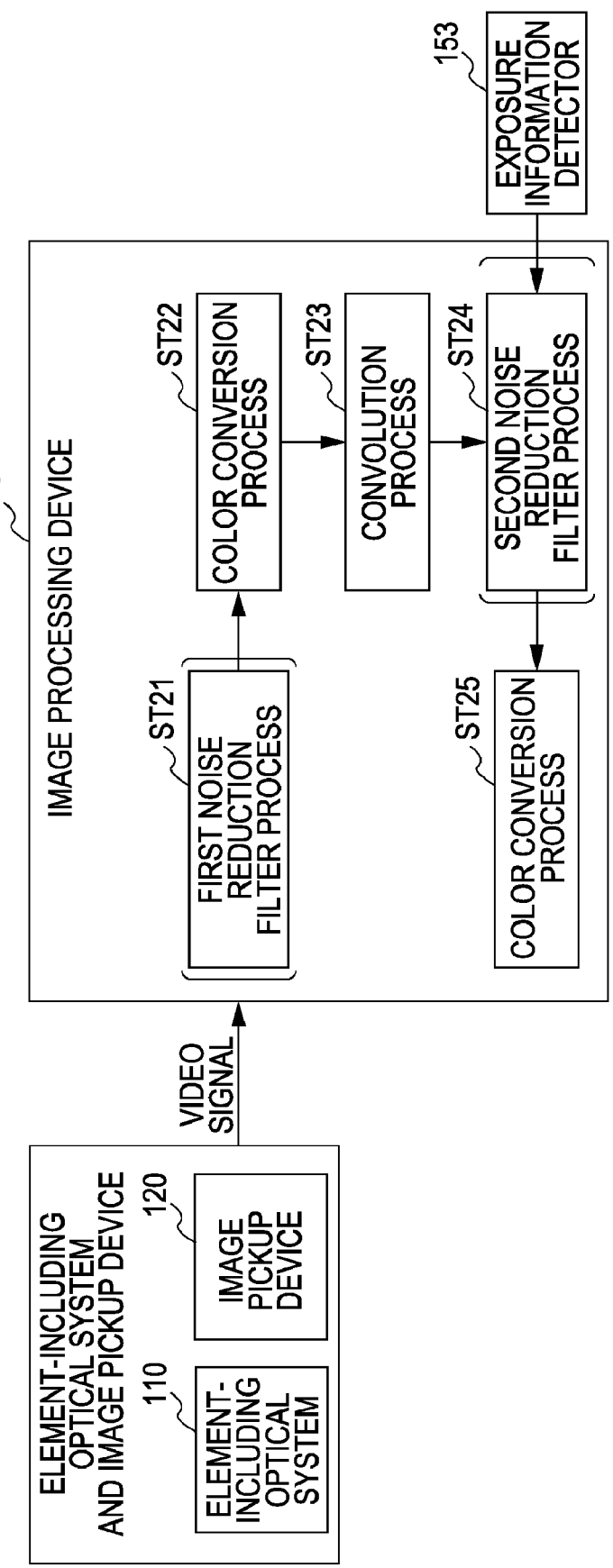
FIG. 38 illustrates a fourth example of the structure including a signal processor and a kernel data storage ROM.

In the example shown in FIG. 38, noise-reduction filtering processes are performed and a noise reduction filter is prepared in advance as the filter kernel data in association with the exposure information.

A second noise-reduction filtering process ST24 may also be omitted.

The exposure information determined when the exposure settings are made is acquired by the exposure information detector 153 and the kernel data is selected through the convolution controller 144.

After a first noise-reduction filtering process ST21, the two-dimensional convolution operator 142 performs a color conversion process ST22 for converting the color space and then performs the convolution process ST23 using the kernel data.

Then, the second noise-reduction filtering process ST24 is performed in accordance with the exposure information and the color space is returned to the original state by a color conversion process ST25. The color conversion processes may be, for example, YCbCr conversion. However, other kinds of conversion processes may also be performed.

The first noise-reduction filtering process ST21 may also be omitted.

In the above-described examples, the filtering process is performed by the two-dimensional convolution operator 142 in accordance with only the exposure information. However, the exposure information may also be used in combination with, for example, object distance information, zoom information, or shooting-mode information so that a more suitable coefficient can be extracted or a suitable operation can be performed.

Figure 39:
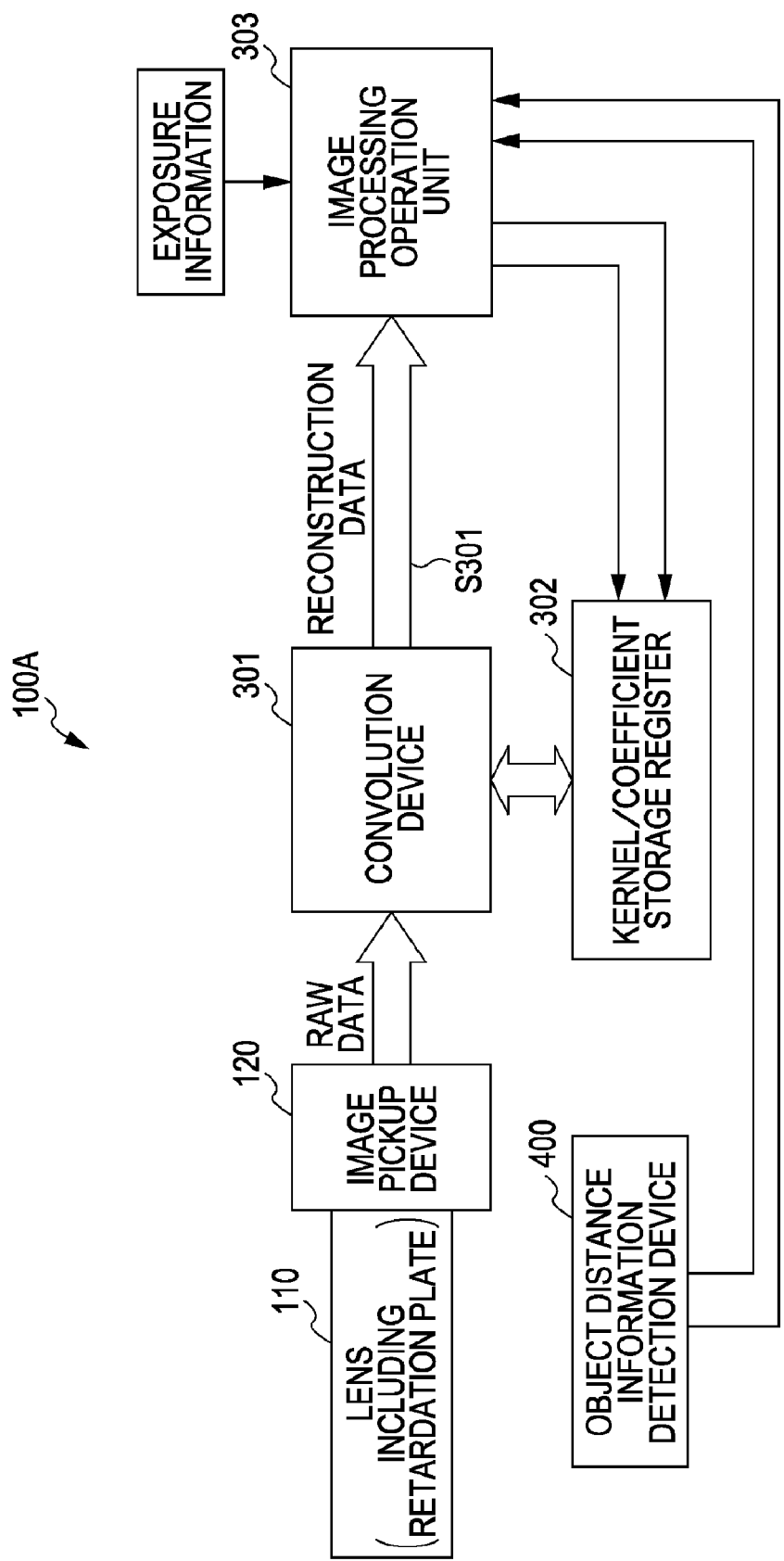
FIG. 39 illustrates an example of the structure of the image processing device in which object distance information and exposure information are used in combination.

FIG. 39 shows an example of the structure of an image processing device in which the object distance information and the exposure information are used in combination. An image pickup apparatus 400 generates an image signal with a smaller blur than that of a blurred object-image signal obtained from a detector 120. As shown in FIG. 39, the image pickup apparatus 400 includes a convolution device 401, a kernel/coefficient storage register 402, and an image processing operation unit 403.

In the image pickup apparatus 400, the image processing operation unit 403 reads information regarding an approximate distance to the object and exposure information from an object-distance-information detection device 500, and determines a kernel size and a coefficient for use in an operation suitable for the object position. The image processing operation unit 403 stores the kernel size and the coefficient in the kernel/coefficient storage register 402. The convolution device 401 performs the suitable operation using the kernel size and the coefficient so as to reconstruct the image.

In the image pickup apparatus including the phase plate (wavefront coding optical element) as the optical wavefront modulation element, a suitable image signal without aberration can be obtained by image processing when the focal distance is within a predetermined focal distance range. However, when the focal distance is outside the predetermined focal distance range, there is a limit to the correction that can be achieved by the image processing. Therefore, the image signal includes aberrations for only the objects outside the above-described range.

When the image processing is performed such that aberrations do not occur in a predetermined small area, blurred portions can be obtained in an area outside the predetermined small area.

According to the present embodiment, a distance to the main object is detected by the object-distance-information detection device 500 which includes a distance detection sensor. Then, an image correction process is performed in accordance with a detected distance.

The above-described image processing is performed by the convolution operation. To achieve the convolution operation, a single, common coefficient may be stored and a correction coefficient may be stored in association with the focal distance. In such a case, the coefficient is corrected using the correction coefficient so that a suitable convolution operation can be performed using the corrected coefficient.

Alternatively, the following structures may also be used.

That is, a kernel size and a coefficient for the convolution operation may be directly stored in advance in association with the focal distance, and the convolution operation may be performed using the thus-stored kernel size and coefficient. Alternatively, the coefficient may be stored in advance as a function of focal distance. In this case, the coefficient to be used in the convolution operation may be calculated from this function in accordance with the focal distance.

More specifically, in the apparatus shown in FIG. 39, the following structure may be used.

That is, the kernel/coefficient storage register 402 functions as conversion-coefficient storing means and stores at least two coefficients corresponding to the aberration caused by at least the phase plate 113a in association with the object distance. The image processing operation unit 403 functions as coefficient-selecting means for selecting one of the coefficients stored in the kernel/coefficient storage register 402. More specifically, the image processing operation unit 403 selects a coefficient that corresponds to the object distance on the basis of information generated by the object-distance-information detection device 500 that functions as object-distance-information generating means.

Then, the convolution device 401, which functions as converting means, converts the image signal using the coefficient selected by the image processing operation unit 403 which functions as the coefficient-selecting means.

Alternatively, as described above, the image processing operation unit 403 functions as conversion-coefficient calculating means and calculates the coefficient on the basis of the information generated by the object-distance-information detection device 500 which functions as the object-distance-information generating means. The thus-calculated coefficient is stored in the kernel/coefficient storage register 402.

Then, the convolution device 401, which functions as the converting means, converts the image signal using the coefficient obtained by the image processing operation unit 403 which functions as the conversion-coefficient calculating means and stored in the kernel/coefficient storage register 402.

Alternatively, the kernel/coefficient storage register 402 functions as correction-value storing means and stores at least one correction value in association with a zoom position or an amount of zoom of the element-including zoom optical system 110. The correction value includes a kernel size of an object aberration image.

The kernel/coefficient storage register 402 also functions as second conversion-coefficient storing means and stores a coefficient corresponding to the aberration caused by the phase plate 113a in advance.

Then, the image processing operation unit 403 functions as correction-value selecting means and selects a correction value from one or more correction values stored in the kernel/coefficient storage register 402 that functions as the correction-value storing means. More specifically, the image processing operation unit 403 selects a correction value that corresponds to the object distance on the basis of the distance information generated by the object-distance-information detection device 500 that functions as the object-distance-information generating means.

Then, the convolution device 401, which functions as the converting means, converts the image signal using the coefficient obtained from the kernel/coefficient storage register 402, which functions as the second conversion-coefficient storing means, and the correction value selected by the image processing operation unit 403, which functions as the correction-value selecting means.

Figure 40:
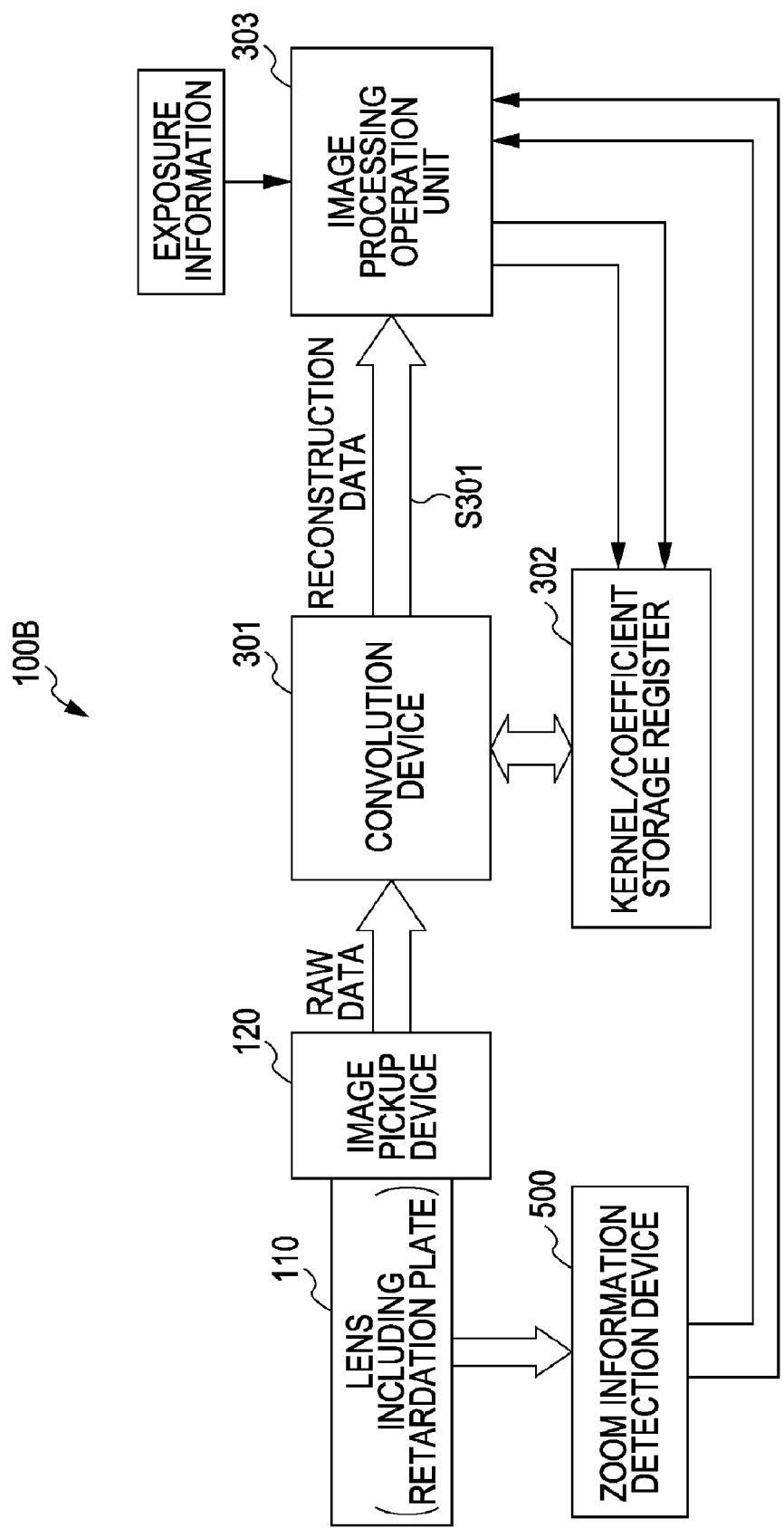
FIG. 40 illustrates an example of the structure of the image processing device in which zoom information and the exposure information are used in combination.

Referring to FIG. 40, an image pickup apparatus 100B generates an image signal with a smaller blur than that of a blurred object-image signal obtained from a detector 120.

Similar to the image pickup apparatus 400 shown in FIG. 39, the image pickup apparatus 400A includes a convolution device 401, a kernel/coefficient storage register 402, and an image processing operation unit 403.

In the image pickup apparatus 400A, the image processing operation unit 403 reads information regarding the zoom position or the amount of zoom and the exposure information from the zoom information detection device 600. The kernel/coefficient storage register 402 stores kernel size data and coefficient data, and transmits a kernel size and a coefficient suitable for the exposure information and the zoom position obtained from the image processing operation unit 403 to the convolution device 401. Accordingly, the convolution device 401 performs a suitable operation so as to reconstruct the image.

As described above, in the case in which the phase plate, which functions as the optical wavefront modulation element, is included in the zoom optical system of the image pickup apparatus, the generated spot image differs in accordance with the zoom position of the zoom optical system. Therefore, in order to obtain a suitable in-focus image by subjecting an out-of-focus image (spot image) obtained by the phase plate to the convolution operation performed by the DSP or the like, the convolution operation that differs in accordance with the zoom position must be performed.

Accordingly, in the present embodiment, the zoom information detection device 600 is provided so that a suitable convolution operation can be performed in accordance with the zoom position and a suitable in-focus image can be obtained irrespective of the zoom position.

In the convolution operation performed by the image processing device 400A, a signal, common coefficient for the convolution operation may be stored in the kernel/coefficient storage register 402.

Alternatively, the following structures may also be used.

That is, a correction coefficient may be stored in the kernel/coefficient storage register 402 in association with the zoom position, and the coefficient may be corrected using the correction coefficient. Accordingly, the following structures may be adopted.

(1) The structure in which a suitable convolution operation is performed using a corrected coefficient (by the convolution device 401).

(2) The structure in which a kernel size and a coefficient for the convolution operation are directly stored in advance in the kernel/coefficient storage register 402 in association with the zoom position, and the convolution operation is performed using the thus-stored kernel size and coefficient (by the convolution device 401).

(3) The structure in which the coefficient is stored in advance in the kernel/coefficient storage register 402 as a function of zoom position, and the convolution operation is performed on the basis of a calculated coefficient (by the convolution device 401).

More specifically, in the apparatus shown in FIG. 40, the following structure may be used.

That is, the kernel/coefficient storage register 402 functions as conversion-coefficient storing means and stores at least two coefficients corresponding to the aberration caused by the phase plate 113a in association with the zoom position or the amount of zoom in the element-including zoom optical system 110. The image processing operation unit 403 functions as coefficient-selecting means for selecting one of the coefficients stored in the kernel/coefficient storage register 402. More specifically, the image processing operation unit 403 selects a coefficient that corresponds to the zoom position or the amount of zoom of the element-including zoom optical system 110 on the basis of information generated by the zoom information detection device 600 that functions as zoom-information generating means.

Then, the convolution device 401, which functions as converting means, converts the image signal using the coefficient selected by the image processing operation unit 403 which functions as the coefficient-selecting means.

Alternatively, as described above with reference to FIG. 39, the image processing operation unit 403 functions as conversion-coefficient calculating means and calculates the coefficient on the basis of the information generated by the zoom information detection device 600 which functions as the zoom-information generating means. The thus-calculated coefficient is stored in the kernel/coefficient storage register 402.

Then, the convolution device 401, which functions as the converting means, converts the image signal on the basis of the coefficient obtained by the image processing operation unit 403, which functions as the conversion-coefficient calculating means, and stored in the kernel/coefficient storage register 402.

Alternatively, the kernel/coefficient storage register 402 functions as correction-value storing means and stores at least one correction value in association with the zoom position or the amount of zoom of the element-including zoom optical system 110. The correction value includes a kernel size of an object aberration image.

The kernel/coefficient storage register 402 also functions as second conversion-coefficient storing means and stores a coefficient corresponding to the aberration caused by the phase plate 113a in advance.

Then, the image processing operation unit 403 functions as correction-value selecting means and selects a correction value from one or more correction values stored in the kernel/coefficient storage register 402, which functions as the correction-value storing means. More specifically, the image processing operation unit 403 selects a correction value that corresponds to the zoom position or the amount of zoom of the element-including zoom optical system on the basis of the zoom information generated by the zoom information detection device 600 that functions as the zoom-information generating means.

Then, the convolution device 401, which functions as the converting means, converts the image signal using the coefficient obtained from the kernel/coefficient storage register 402, which functions as the second conversion-coefficient storing means, and the correction value selected by the image processing operation unit 403, which functions as the correction-value selecting means.

Figure 41:
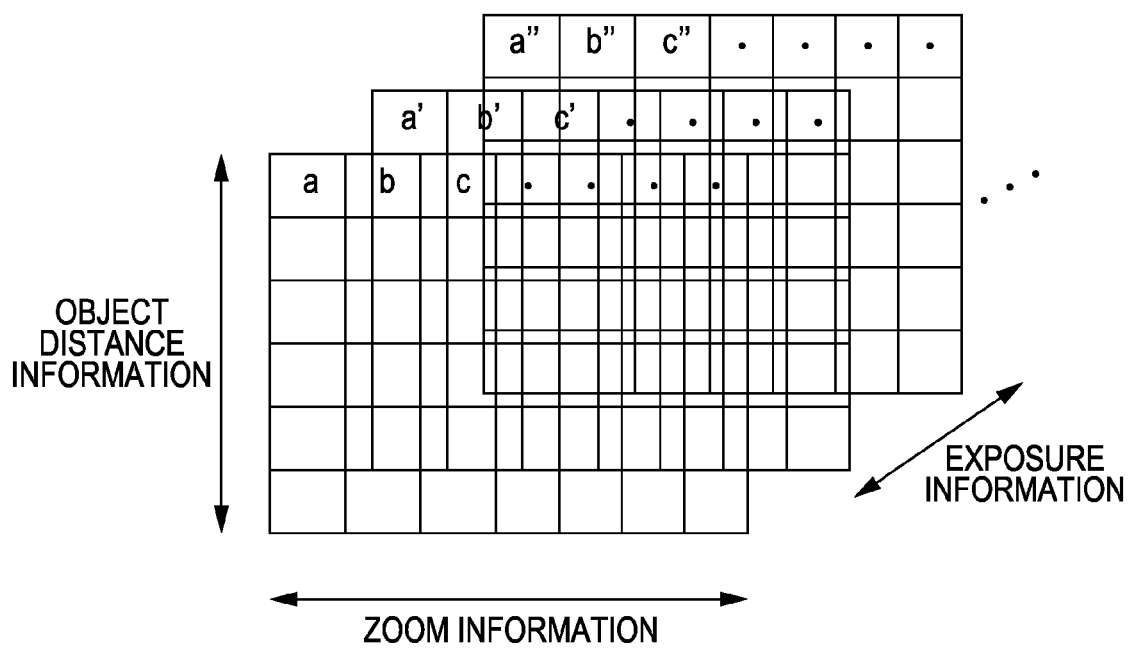
FIG. 41 illustrates an example of a filter structure applied when the exposure information, the object distance information, and the zoom information are used in combination.
Figure 42:
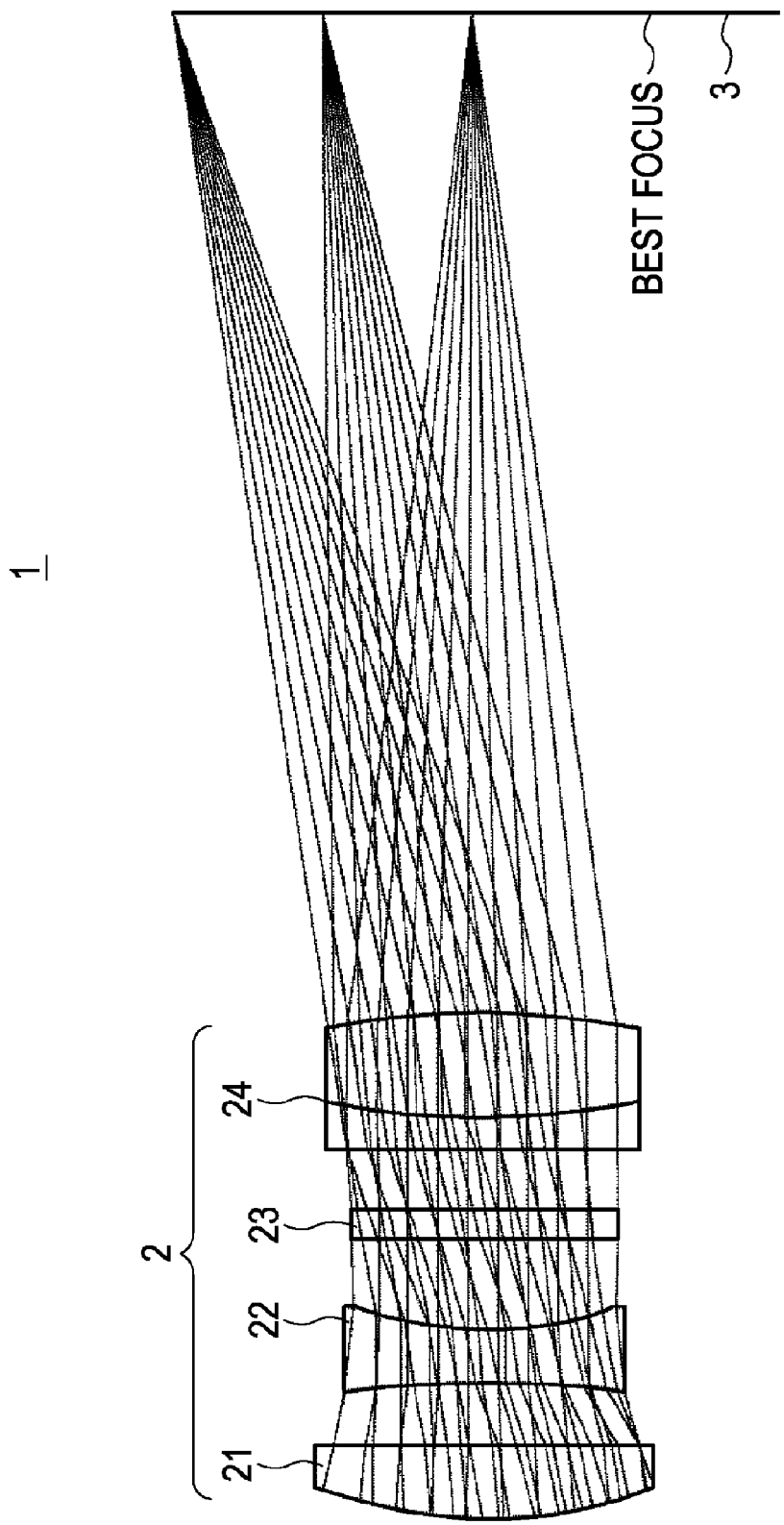
FIG. 42 is a schematic diagram illustrating the structure of a known image-pickup lens apparatus and the state of ray bundles.
Figure 43A:
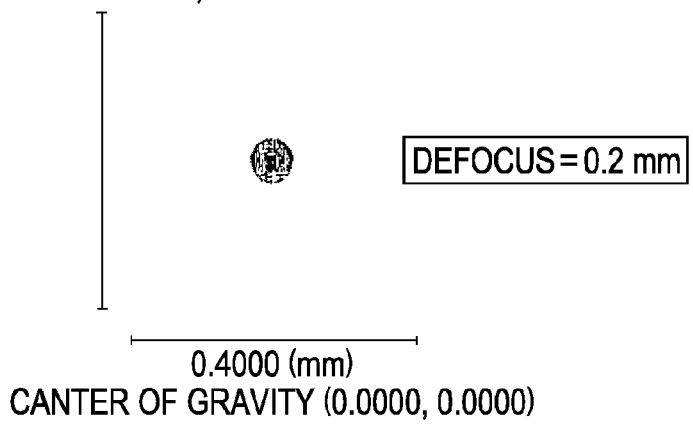
FIG. 43A illustrates a spot image formed on a light-receiving surface of an image pickup device in the image-pickup lens apparatus shown in FIG. 38 when a focal point is displaced by 0.2 mm (Defocus=0.2 mm).
Figure 43B:
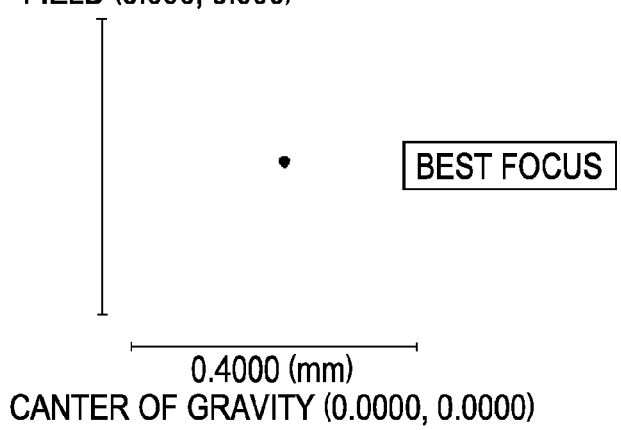
FIG. 43B illustrates a spot image formed on the light-receiving surface of the image pickup device in the image-pickup lens apparatus shown in FIG. 38 when the focal point is not displaced (Best focus).
Figure 43C:
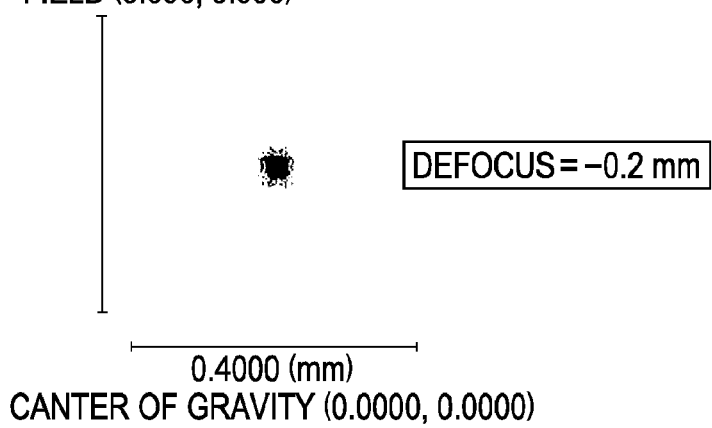
FIG. 43C illustrates a spot image formed on the light-receiving surface of the image pickup device in the image-pickup lens apparatus shown in FIG. 38 when the focal point is displaced by −0.2 mm (Defocus=−0.2 mm).

FIG. 41 shows an example of a filter structure used when the exposure information, the object distance information, and the zoom information are used in combination. In this example, two-dimensional information structure is formed by the object distance information and the zoom information, and the exposure information elements are arranged along the depth.

Figure 4:
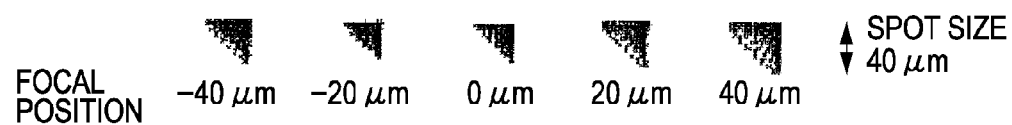
FIG. 4 is a diagram illustrating the shapes of spot images formed at the image height center by the image pickup apparatus having the zoom function at the wide-angle position.
Figure 5:
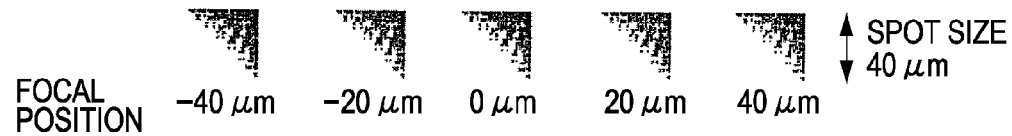
FIG. 5 is a diagram illustrating the shapes of spot images formed at the image height center by the image pickup apparatus having the zoom function at the telephoto position.

FIGS. 2 and 3 show an example of an element-including optical system, and an element-including optical system according to the present invention is not limited to that shown in FIGS. 2 and 3. In addition, FIGS. 4 and 5 show examples of spot shapes, and the spot shapes of the present embodiment are not limited to those shown in FIGS. 4n and 5.

The kernel data storage ROM is not limit to those storing the kernel sizes and values in association the optical magnification, the F number, and the object distance information, as shown in FIGS. 31, 32, and 33. In addition, the number of kernel data elements to be prepared is not limited to three.

Although the amount of information to be stored is increased as the number of dimensions thereof is increase to three, as shown in FIG. 41, or more, a more suitable selection can be performed on the basis of various conditions in such a case. The information to be stored includes the exposure information, the object distance information, the zoom information, etc., as described above.

In the image pickup apparatus including the phase plate as the optical wavefront modulation element, as described above, a suitable image signal without aberration can be obtained by image processing when the focal distance is within a predetermined focal distance range. However, when the focal distance is outside the predetermined focal distance range, there is a limit to the correction that can be performed by the image processing. Therefore, the image signal includes aberrations for only the objects outside the above-described range.

When the image processing is performed such that aberrations do not occur in a predetermined small area, blurred portions can be obtained in an area outside the predetermined small area.

As described above, according to the present embodiment, the image pickup apparatus 100 includes the element-including optical system 110 and the detector 120 for forming a first image. The image processing device 140 includes the ROM 143 that for storing reconstruction filter information, such as kernel data, that is selected in advance. The image processing device 140 has a function of improving contrast by performing a reconstruction filtering process for the optical transfer function (OTF) using the reconstruction filter information stored in the ROM 143. The reconstruction filter information stored in the ROM 143 is selected from a plurality of pieces of information stored in reconstruction filters using which, of images reconstructed using reconstruction filters, an image that satisfy a predetermined evaluation criterion can be obtained. Therefore, the optical system can be simplified. As a result, reconstruction images with small influence of noise can be obtained, and images of objects at a predetermined distance can be captured.

The focal position of the element-including optical system 110 is adjusted by the movement to a focal position corresponding to a predetermined object distance using a contrast of the object based on the image signal. The image signal is repeatedly detected through the element-including optical system which includes an optical system and an optical wavefront modulation element for modulating the optical transfer function (OTF). Accordingly, the focused state can be obtained by detecting the contrast in a region where the contrast is relatively high, and shooting at the predetermined object distance can be performed.

What is claimed is:

1. An image pickup apparatus comprising:
   an optical system;
   a detector picking up an object image that passes through said optical system;
   a memory storing reconstruction filter information that is selected from one or a plurality of pieces of reconstruction filter information using which an image that satisfies a predetermined evaluation criterion can be obtained; and
   an image processing unit that performs a reconstruction filtering process for an object image signal from said detector using the reconstruction filter information stored in said memory, and for an optical transfer function to improve a contrast.

2. The image pickup apparatus according to claim 1, wherein the reconstruction filter information is information about one or more filters that are changed in accordance with at least one of manufacturing and assembling variations in at least one of the optical system and a detector.

3. The image pickup apparatus according to claim 1, wherein the reconstruction filter information is selected on the basis of a relationship between a modulation transfer function distribution and a plurality of filters in which optical transfer functions of optical systems having predetermined variations are averaged.

4. The image pickup apparatus according to claim 1, wherein said optical system is an element-including optical system including an optical wavefront modulation element that modulates an optical transfer function, said detector picks up an object image that passes through the element-including optical system, and image processing device generates an image signal with a smaller blur than that of a signal of a blurred object image output from said detector.

5. The image pickup apparatus according to claim 4, wherein said optical wavefront modulation element has a function of making a change in the optical transfer function in accordance with a distance to an object smaller than that of said optical system.

6. The image pickup apparatus according to claim 4, wherein when an optical axis of said optical system is z axis and two axes perpendicular to the z axis and to each other are x and y axes, a phase of said optical wavefront modulation element is expressed as follows:

$$z = \exp\left\{i \times \left(\sum_{j=1} C_j x^m y^n\right)\right\}$$

where m and n are integers and $$j = \frac{[(m+n)^2 + m + 3n]}{2}, \ |x| \le 1, \ \text{and} \ |y| \le 1$$

are satisfied.

7. The image pickup apparatus according to claim 4, wherein the optical transfer function of said element-including optical system is 0.1 or more for a frequency equal to or less than the Nyquist frequency of said detector over an object distance range larger than the depth of field of said optical system.

8. The image pickup apparatus according to claim 4, wherein said image processing device includes a noise-reduction filter.

9. The image pickup apparatus according to claim 1, wherein said memory stores a coefficient used by said signal processor for performing a noise reducing process in accordance with exposure information.

10. The image pickup apparatus according to claim 9, wherein the exposure information includes aperture information.

11. The image pickup apparatus according to claim 1, wherein said memory stores a coefficient used by said signal processor for performing an optical-transfer-function reconstruction process in accordance with exposure information.

12. The image pickup apparatus according to claim 11, wherein the exposure information includes aperture information.

13. A manufacturing apparatus for manufacturing an image pickup apparatus comprising an optical system unit and a filtering process selector;
   the optical system unit comprising:
      an optical system;
      a detector picking up an object image that passes through said optical system; and
      a memory storing reconstruction filter information;
   the filtering process selector comprising:
      a reconstruction filter storage unit that stores a plurality of pieces of reconstruction filter information;
      an operation unit that reconstructs an image from said optical system unit using the reconstruction filter information stored in said reconstruction filter storage unit;
      an image evaluation unit that determines whether or not the image reconstructed by said operation unit satisfies a predetermined evaluation criterion; and
      a memory update unit that updates the memory in said optical system unit with reconstruction filter information using which a reconstructed image that satisfies the evaluation criterion according to the image evaluation unit is obtained.

14. The manufacturing apparatus according to claim 13, wherein the reconstruction filter information is information about one or more filters that are changed in accordance with at least one of manufacturing and assembling variations in at least one of the optical system and a detector.

15. A method of manufacturing a manufacturing apparatus for manufacturing an image pickup apparatus comprising:
   a storing step of storing a plurality of pieces of reconstruction filter information in a memory;
   an image pickup step of picking up an image that passes through an optical system;
   a reconstruction step of reconstructing the image obtained in said image pickup step using the reconstruction filter information obtained in said storing step;

an evaluation step of evaluating whether or not the image reconstructed in said reconstruction step satisfies a predetermined evaluation criterion; and an updating step of updating the reconstruction filter information in the memory using which a reconstructed image that satisfies the evaluation criterion in said image evaluation step is obtained.

16. The method of manufacturing a manufacturing apparatus according to claim 15, wherein the reconstruction filter information is information about one or more filters that are changed in accordance with at least one of manufacturing and assembling variations in at least one of the optical system and a detector.

* * * * *